US 12,074,551 B2

(12) United States Patent
Hara et al.

(10) Patent No.: US 12,074,551 B2
(45) Date of Patent: Aug. 27, 2024

(54) MOTOR CONTROL DEVICE, ELECTROMECHANICAL UNIT, ELECTRIC VEHICLE SYSTEM, AND MOTOR CONTROL METHOD

(71) Applicant: Hitachi Astemo, Ltd., Hitachinaka (JP)

(72) Inventors: Takafumi Hara, Tokyo (JP); Toshiyuki Ajima, Tokyo (JP); Takaya Tsukagoshi, Tokyo (JP); Katsuhiro Hoshino, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 121 days.

(21) Appl. No.: 17/918,197

(22) PCT Filed: Jan. 22, 2021

(86) PCT No.: PCT/JP2021/002147
§ 371 (c)(1),
(2) Date: Oct. 11, 2022

(87) PCT Pub. No.: WO2021/210232
PCT Pub. Date: Oct. 21, 2021

(65) Prior Publication Data
US 2023/0141601 A1 May 11, 2023

(30) Foreign Application Priority Data
Apr. 16, 2020 (JP) .................................. 2020-073617

(51) Int. Cl.
H02P 27/08 (2006.01)
B60L 53/20 (2019.01)
H02P 23/14 (2006.01)

(52) U.S. Cl.
CPC .............. *H02P 27/08* (2013.01); *B60L 53/20* (2019.02); *H02P 23/14* (2013.01); *B60L 2210/40* (2013.01)

(58) Field of Classification Search
CPC .......... H02P 27/08; H02P 23/14; B60L 53/20; B60L 2210/40
See application file for complete search history.

(56) References Cited

U.S. PATENT DOCUMENTS

2010/0127656 A1  5/2010  Ohtani et al.
2017/0294863 A1  10/2017  Takahashi et al.
(Continued)

FOREIGN PATENT DOCUMENTS

JP  2008-312420 A  12/2008
JP  2009-291019 A  12/2009
(Continued)

OTHER PUBLICATIONS

International Search Report with English Translation and Written Opinion dated May 18, 2021 in corresponding International Application No. PCT/JP2021/002147.

*Primary Examiner* — Zoheb S Imtiaz
(74) *Attorney, Agent, or Firm* — Foley & Lardner LLP

(57) ABSTRACT

The present invention addresses the problem of properly performing motor control during overmodulation. In a motor control device 1, a carrier wave frequency adjusting unit 16 adjusts a carrier wave frequency fc so as to change a voltage phase error Δθv representing the phase difference between three-phase voltage commands Vu*, Vv*, Vw* and a triangular wave signal Tr. When a modulation factor H in accordance with the voltage amplitude ratio between the DC power supplied from a high voltage battery to an inverter and AC power output from the inverter to a motor exceeds a predetermined value, for example, 1.15, a current control unit 14 corrects the amplitudes and phases of a d-axis (Continued)

voltage command Vd* and a q-axis voltage command Vq* on the basis of a carrier wave phase difference Δθcarr representing the phase of the triangular wave signal Tr.

13 Claims, 16 Drawing Sheets

(56) References Cited

U.S. PATENT DOCUMENTS

| | | | |
|---|---|---|---|
| 2018/0226913 A1 | 8/2018 | Hatakeyama et al. | |
| 2020/0220488 A1* | 7/2020 | Mori | H02M 7/5387 |
| 2022/0376641 A1* | 11/2022 | Mori | H02P 29/028 |

FOREIGN PATENT DOCUMENTS

| | | |
|---|---|---|
| JP | 2017-192197 A | 10/2017 |
| WO | WO-2017/037941 A1 | 3/2017 |

* cited by examiner

MOTOR CONTROL DEVICE, ELECTROMECHANICAL UNIT, ELECTRIC VEHICLE SYSTEM, AND MOTOR CONTROL METHOD

TECHNICAL FIELD

The present invention relates to a motor control device, an electromechanical unit, an electric vehicle system, and a motor control method.

BACKGROUND ART

In an inverter drive device that performs pulse width modulation (PWM) control of a voltage command to drive a motor, an asynchronous PWM system is frequently adopted, the asynchronous PWM system where the PWM control is performed by keeping a frequency of a carrier wave at a constant value with respect to a variable output frequency of an inverter. Here, when the output frequency of the inverter becomes higher and the number of output pulses per cycle of the voltage command decreases, an output error of the inverter increases. Thus, a synchronous PWM system is adopted, the synchronous PWM system where the PWM control is performed by changing the frequency of the carrier wave in accordance with the variable output frequency of the inverter.

The synchronous PWM control system provides a technique of overmodulation PWM control configured that: in a mode of overmodulation where an amplitude of the voltage command is greater than an amplitude of the carrier wave, e.g., a triangular wave or a sawtooth wave, the amplitude of the voltage command is nonlinearly increased to cause an amplitude of the voltage outputted from the inverter to be at a desired value (for example, PTL 1 as follows).

CITATION LIST

Patent Literature

PTL 1: JP 2008-312420 A

SUMMARY OF INVENTION

Technical Problem

The technique disclosed in PTL 1 is effective when a phase difference between the carrier wave and the voltage command is constant; however, when the phase difference is not constant, the amplitude and a phase of the voltage outputted from the inverter during the overmodulation respectively change in accordance with the phase difference between the carrier wave and the voltage command. Accordingly, with the conventional system, the motor control is not appropriately performed during the overmodulation.

Solution to Problem

In order to solve the problem described above, the present invention adopts a configuration, for example, as disclosed the claims. This application includes a plurality of means for solving the problem above, and an example thereof is a motor control device connected to a power converter that performs power conversion from direct current power to alternating current power, and configured to control drive of an alternating current motor driven with the alternating current power.

The motor control device includes:
a current control unit configured to generate a voltage command in accordance with a torque command;
a carrier wave generation unit configured to generate a carrier wave;
a carrier wave frequency adjusting unit configured to adjust a frequency of the carrier wave; and
a gate signal generation unit configured to perform pulse width modulation of the voltage command based on the carrier wave, so as to generate a gate signal to control an operation of the power converter.

In the motor control device, the carrier wave frequency adjusting unit adjusts the frequency of the carrier wave, so as to change a phase difference between a phase of the voltage command and a phase of the carrier wave, and the current control unit corrects an amplitude of the voltage command and the phase of the voltage command based on the phase of the carrier wave, when a modulation rate in accordance with a voltage amplitude ratio between the direct current power and the alternating current power exceeds a predetermined value.

Further provided is an electromechanical unit including the motor control device, the power converter connected to the motor control device, the alternating current motor driven by the power converter, and a gear configured to transmit rotation drive force of the alternating current motor. In the electromechanical unit, the alternating current motor, the power converter, and the gear are integrally formed.

Still further provided is an electric vehicle system including the motor control device, the power converter connected to the motor control device, and the alternating current motor driven by the power converter. The electric vehicle system travels with the rotation drive force of the alternating current motor.

Even still further provided is a motor control method configured to control an operation of a power converter that performs power conversion from direct current power to alternating current power, so as to control drive of an alternating current motor driven with the alternating current power.

The motor control method includes:
generating a voltage command in accordance with a torque command;
generating a carrier wave;
adjusting a frequency of the carrier wave to change a phase difference between a phase of the voltage command and a phase of the carrier wave;
performing pulse width modulation of the voltage command based on the carrier wave, so as to generate a gate signal to control the operation of the power converter; and
when, in generating the voltage command, a modulation rate in accordance with a voltage amplitude ratio between the direct current power and the alternating current power exceeds a predetermined value, correcting an amplitude of the voltage command and the phase of the voltage command based on the phase of the carrier wave.

Advantageous Effects of Invention

In accordance with the present invention, it as possible to appropriately perform motor control during overmodulation.

DESCRIPTION OF EMBODIMENTS (First embodiment) A first embodiment of the present invention will be described below with reference to the drawings.

Figure 1:
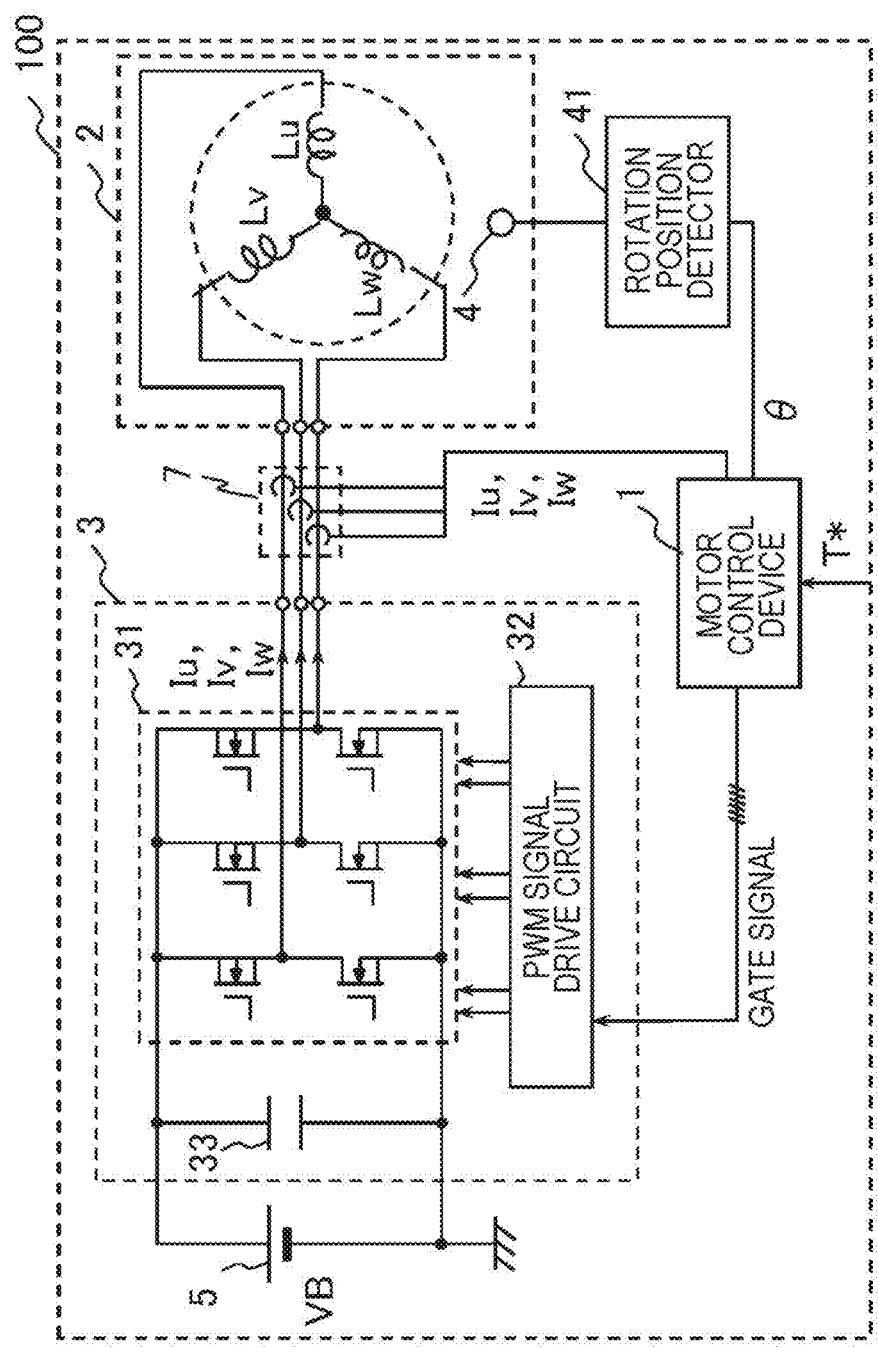
FIG. 1 is an overall configuration diagram of a motor drive system including a motor control device according to an embodiment of the present invention.
Figure 2:
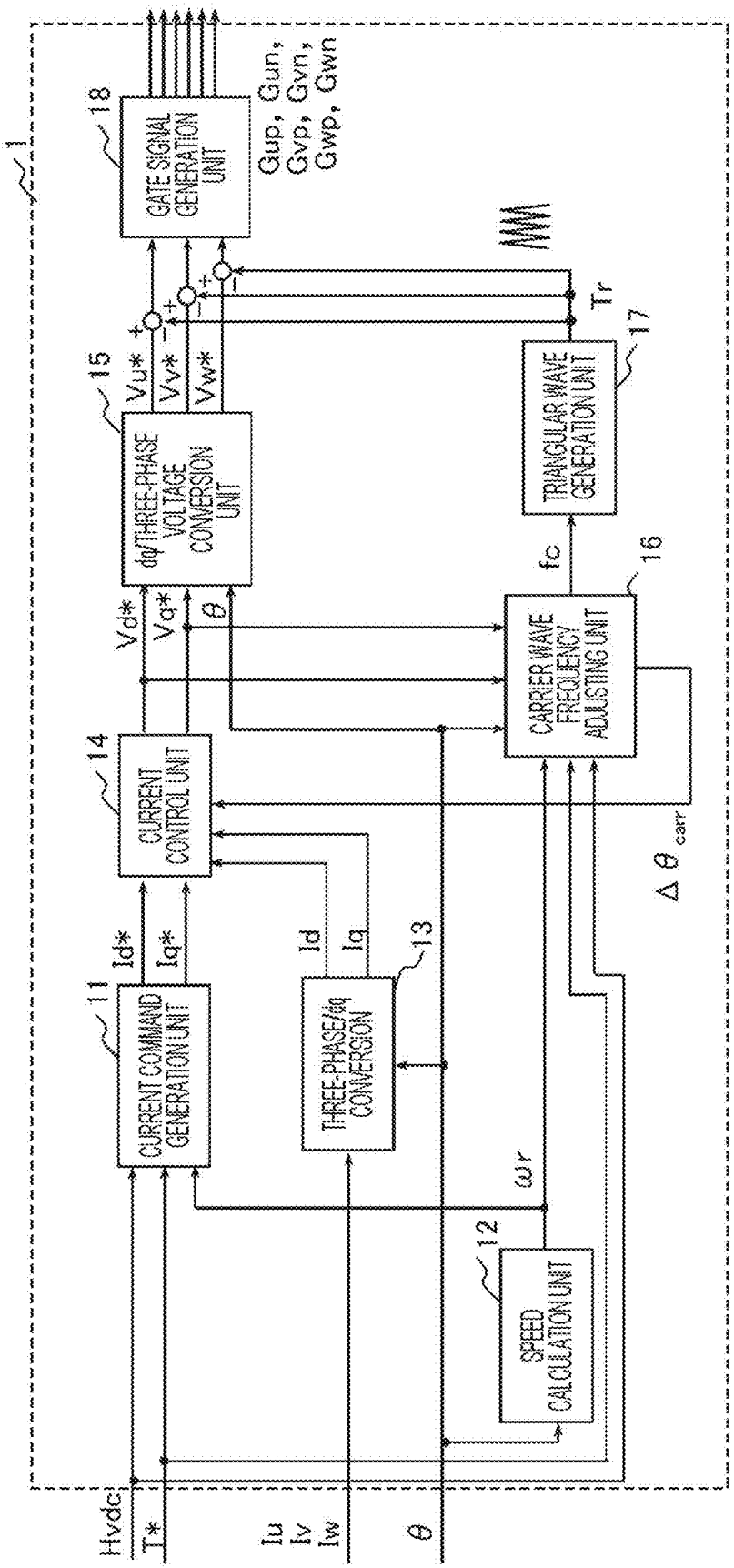
FIG. 2 is a block diagram illustrating a functional configuration of a motor control device according to a first embodiment of the present invention.

FIG. 1 is an overall configuration diagram of a motor drive system including a motor control device according to an embodiment of the present invention. In FIG. 2, a motor drive system 100 includes a motor control device 1, a permanent magnet synchronous motor (hereinafter, simply referred to as a "motor") 2, an inverter 3, a rotation position detector 41, and a high voltage battery 5.

The motor control device 1 generates a gate signal to control drive of the motor 2 based on a torque command T* in accordance with a target torque required of the motor 2 by a vehicle, and outputs the gate signal to the inverter 3. Details of the motor control device 1 will be described later.

The inverter 3 includes an inverter circuit 31, a pulse width modulation (PWM) signal drive circuit 32, and a smoothing capacitor 33. The PWM signal drive circuit 32 generates a PWM signal to control each switching element included in the inverter circuit 31 based on the gate signal inputted from the motor control device 1, and outputs the PWM signal to the inverter circuit 31. The inverter circuit 31 includes the switching elements corresponding respectively to upper arms and lower arms of U phase, V phase, and W phase. The switching elements are respectively controlled in accordance with the PUNT signal inputted from the PWM signal drive circuit 32, so that direct current (DC) power supplied from the high voltage battery 5 is converted to alternating current (AC) power; and the AC power is outputted to the motor 2. The smoothing capacitor 33 smooths the DC power supplied from the high voltage battery 5 to the inverter circuit 31.

The motor 2 is a synchronous motor rotationally driven by the AC power supplied from the inverter 3, and includes a stator and a rotor. When the AC power inputted from the inverter 3 is applied to armature coils Lu, Lv, and Lw, each provided in the stator, three-phase AC currents Iu, Iv, and Iw flow in the motor 2, and armature magnetic flux is generated in each of the armature coils Lu, Lv, and Lw. When attractive force and repulsive force are generated between the armature magnetic flux of each of the armature coils and magnet magnetic flux of permanent magnet disposed in the rotor, torque is generated in the rotor, causing the rotor to be rotationally driven.

The motor 2 has a rotation position sensor 4 attached thereto to detect a rotation position 3 of the rotor. The rotation position detector 41 calculates the rotation position θ based on a signal inputted from the rotation position sensor 4. The rotation position 9 that the rotation position detector 41 has calculated is inputted to the motor control device 1, so as to be used in phase control of the AC power when the motor control device 1 generates the gate signal in accordance with a phase of induction voltage of the motor 2.

Here, the rotation position sensor 4 is preferably a resolver including an iron core and a winding. Alternatively, the rotation position sensor 4 may be a magneto resistive device such as a GMR sensor, or may be a sensor including a hall element. Further, the rotation position detector 41 may not use the signal inputted from the rotation position sensor 4 but presume the rotation position θ based on the three-phase AC currents Iu, Iv, Iw flowing through the motor 2 or three-phase AC voltages Vu, Vv, and Vw applied from the inverter 3 to the motor 2.

The inverter 3 and the motor 2 have a current detection means 7 disposed therebetween. The current detection means 7 detects the three-phase AC currents Iu, Iv, Iw (U-phase AC current Iu, V-phase AC current Iv, and W-phase AC current Iw) energizing the motor 2. The current detection means 7 includes, for example, a hall current sensor. When the current detection means 7 has detected the three-phase AC currents Iu, Iv, and Iw, the result is inputted to the motor control device 1, so as to be used when the motor control device 1 generates the gate signal. FIG. 2 illustrates an example where the current detection means 7 includes three current detectors. Alternatively, the current detection means 7 may include two current detectors, while a remaining phase AC current may be calculated based on that a sum of the three-phase AC currents Iu, Iv, and Iw is zero. Still alternatively, pulsed DC current flowing from the high voltage battery 5 to the inverter 3 may be detected by a shunt resistor or others inserted between the smoothing capacitor 33 and the inverter 3, and the three-phase AC currents Iu, Iv, Iw may be calculated based on the three-phase AC voltages Vu, VV, and Vw applied from the inverter 3 to the motor 2.

Next, details of the motor control device 1 will be described. FIG. 2 is a block diagram illustrating a functional configuration of the motor control device 1 according to the first embodiment of the present invention. In FIG. 2, the motor control device 1 includes functional blocks of a current command generation unit 11, a speed calculation unit 12, a three-phase/dq conversion current control unit 13, a current control unit 14, a dq/three-phase voltage command conversion unit 15, a carrier wave frequency adjusting unit 16, a triangular wave generation unit 17, and a gate signal generation unit 18. The motor control device 1 includes, for example, a microcomputer configured to execute a predetermined program such that each of these functional blocks fulfills the corresponding function. Alternatively, the motor control device 1 may use a hardware circuit such as a logic IC or an FPGA such that some or all of these functional blocks respectively fulfill the functions.

The current command generation unit 11 calculates a d-axis current command Id* and a q-axis current command Iq* based on the torque command T* inputted and power supply voltage Hvdc. The current command generation unit 11 obtains the d-axis current command Id* and the q-axis current command Ig*, each in accordance with the torque command T*, based on, for example, a predetermined current command map, formula, or equation.

The speed calculation unit 12 calculates rotation speed or as rotation speed (revolutions per minute (rpm)) of the motor 2 based on a temporal change of the rotation position θ. The rotation speed ωr may be expressed by a value of angular speed (rad/s) or a value of the revolutions per minute (rpm). Alternatively, these values may be mutually converted and used.

Based on the rotation position θ that the rotation position detector 41 has obtained, the three-phase/dq conversion current control unit. 13 performs dq conversion with respect to the three-phase AC currents Iu, Iv, and Iw that the current detection means 7 has detected, and then calculates a d-axis current value Id and a q-axis current value Iq.

Based on deviations between the d-axis current command Id* and the q-axis current command Iq* outputted from the current command generation unit 11 and the d-axis current value Id and the q-axis current value Iq outputted from the three-phase/dq conversion current control unit 13, the current control unit 14 calculates a d-axis voltage command Vd* and a q-axis voltage command Vq* in accordance with the torque command T* such that these values respectively match. Here, based on, for example, a control method such as PI control, the current control unit 14 obtains the d-axis voltage command Vd* in accordance with the deviation between the d-axis current command Id* and the d-axis current value Id, and obtains the q-axis voltage command Vq* in accordance with the deviation between the q-axis current command Iq* and the q-axis current value Iq.

In the motor control device 1 of this embodiment, the current control unit 14 has a feature in a method to calculate the d-axis voltage command Vd* and the q-axis voltage command Vq* in control of the overmodulation where an amplitude of voltage outputted from the inverter 3 is greater than DC voltage from the high voltage battery 5. In the control of the overmodulation, the current control unit 14 corrects an amplitude and a phase of the d-axis voltage command Vd* as well as an amplitude and a phase of the q-axis voltage command Vq*, based on a carrier wave phase difference Δθcarr calculated by the carrier wave frequency adjusting unit 16. This configuration will be described in detail later.

With respect to the d-axis voltage command Vd* and the q-axis voltage command Vq* that the current control unit 14 has calculated, the dq/three-phase voltage command conversion unit 15 performs three-phase conversion based on the rotation position θ that the rotation position detector 41 has obtained, so as to calculate the three-phase voltage commands Vu*, Vv*, and Vw* (U-phase voltage command Vu*, V-phase voltage command Vv*, and W-phase voltage command Vw*). As a result, the three-phase voltage commands Vu*, Vv*, and Vw* are generated in accordance with the torque command T*.

Based on the d-axis voltage command Vd* as well as the q-axis voltage command Vq* that the current command generation unit 11 has generated, the rotation position θ that the rotation position detector 41 has obtained, the rotation speed ωr that the speed calculation unit 12 has obtained, the torque command T*, and the power supply voltage Hvdc, the carrier wave frequency adjusting unit 16 calculates a carrier wave frequency fc and the carrier wave phase difference Δθcarr. Here, the carrier wave frequency fc represents frequency of the carrier wave used to generate the gate signal, and the carrier wave phase difference Δθcarr represents a phase difference between a reference voltage phase θvb and a phase of the carrier wave. The reference voltage phase θvb represents a reference value of the phase of the carrier wave in synchronous PWM control, and is obtained when the carrier wave frequency adjusting unit 16 calculates the carrier wave frequency fc. In other words, the carrier wave phase difference Δθcarr represents the phase of the carrier wave based on the reference voltage phase θvb. Details of the reference voltage phase θvb will be described later. When the triangular wave generation unit 17 has generated the carrier wave in accordance with the carrier wave frequency fc, the frequency of the carrier wave is adjusted such that vibration or noise is less prone to occur in motor 2. Further, in the control of the overmodulation, the current control unit 14 corrects the d-axis voltage command Vd* and the q-axis voltage command Vq* based on the carrier wave phase difference Δθcarr. Details of the method where the carrier wave frequency adjusting unit 16 calculates the carrier wave frequency fc and the carrier wave phase difference Δθcarr will be described later.

The triangular wave generation unit 17 generates a triangular wave signal (carrier wave signal) Tr based on the carrier wave frequency fc that the carrier wave frequency adjusting unit 16 has calculated.

Based on the triangular wave signal Tr outputted from the triangular wave generation unit 17, the gate signal generation unit 18 performs pulse width modulation on each of the three-phase voltage commands Vu*, Vv*, and Vw* outputted from the dq/three-phase voltage command conversion unit 15, and generates the gate signal to control an operation of the inverter 3. Specifically, based on a result of a comparison between the three-phase voltage commands Vu*, Vv*, and Vw* outputted from the dq/three-phase voltage command conversion unit 15 and the triangular wave signal Tr outputted from the triangular wave generation unit 17, the gate signal generation unit 18 generates pulsed voltage in each of the U-phase, the V-phase, and the W-phase. Then, based on the pulsed voltage generated, the gate signal generation unit 18 generates the gate signals corresponding respectively to the switching elements in the phases of the inverter 3. When generating the gate signals, the gate signal generation unit 18 logically inverts gate signals Gup, Gvp, and Gwp respectively for the upper arms of the phases, and generates gate signals Gun, Gvn, and Gwn respectively for the lower arms of the phases. Each of the gate signals that the gate signal generation unit 18 has generated is outputted from the motor control device 1 to the PWM signal drive circuit 32 of the inverter 3, so as to be converted by the PWM signal drive circuit 32 to the PWM signal. As a result, each of the switching elements of the inverter circuit 31 is controlled to be turned on/off, and the voltage outputted from the inverter 3 is adjusted.

Next, an operation of the carrier wave frequency adjusting unit 16 in the motor control device 1 will be described. As has been described above, the carrier wave frequency adjusting unit 16 calculates the carrier wave frequency fc and the carrier wave phase difference Δθcarr based on the d-axis voltage command Vd*, the q-axis voltage command Vq*, the rotation position θ, the rotation speed ωr, the torque command T*, and the power supply voltage Hvdc. The carrier wave frequency adjusting unit 16 sequentially controls frequency of the triangular wave signal Tr that the triangular wave generation unit 17 has generated in accordance with the carrier wave frequency fc. With this configuration, the cycle and the phase of the triangular wave signal Tr (the carrier wave) are respectively adjusted to have a desired relationship with voltage waveforms of the three-phase voltage commands Vu*, Vv*, and Vw* in accordance with the torque command T*. Here, the desired relationship corresponds to, for example, a relationship where electromagnetic excitation force or torque pulsation generated in the motor 2 by harmonic current (due to the switching operation of the inverter 3 based on the PWM) has the same cycle and reverse phase as and to electromagnetic excitation force or torque pulsation generated by fundamental wave current in accordance with the voltage command.

Figure 3:
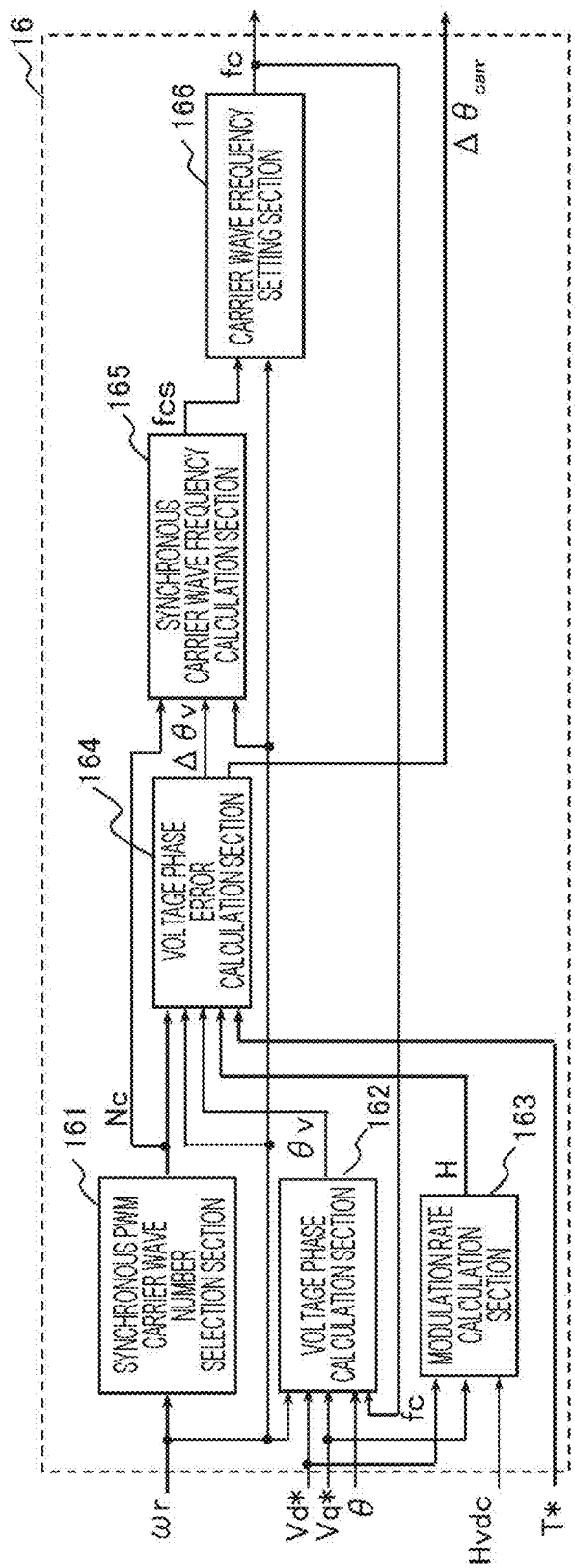
FIG. 3 is a block diagram of a carrier wave frequency adjusting unit according to the first embodiment of the present invention.

FIG. 3 is a block diagram of the carrier wave frequency adjusting unit 16 according to the first embodiment of the present invention. The carrier wave frequency adjusting unit 16 includes a synchronous PWM carrier wave number selection section 161, a voltage phase calculation section 162, a modulation rate calculation section 163, a voltage phase error calculation section 164, a synchronous carrier wave frequency calculation section 165, and a carrier wave frequency setting section 166.

The synchronous PWM carrier wave number selection section 161 selects, based on the rotation speed ωr, a synchronous PWM carrier wave number Nc that represents the number of the carrier waves per cycle of the voltage waveform in the synchronous PWM control. The synchronous PWM carrier wave number selection section 161 selects, as the synchronous PWM carrier wave number Nc, for example, a number out of multiples of 3, the number that satisfies a conditional expression of Nc=3×(2×n−1). In the conditional expression, "n" corresponds to any natural number, and the synchronous PWM carrier wave number selection section 161 selects, as the "n", for example, 1 (Nc=3), 2 (Nc=9), 3 (Nc=15), or others. Alternatively, the synchronous PWM carrier wave number selection section 161 may use some special carrier wave to select, as the synchronous PWM carrier wave number Nc, a number that is one of the multiples of 3 but does not satisfy the conditional expression, such as (Nc=6) or (Nc=12). The synchronous PWM carrier wave number selection section 161 may select the synchronous PWM carrier wave number Nc based on not only the rotation speed or but also the torque command T*. Still alternatively, the synchronous PWM carrier wave number selection section 161 may, for example, set hysteresis to change the criteria for selecting the synchronous PWM carrier wave number Nc between when the rotation speed ωr increases and when the rotation speed ωr decreases.

The voltage phase calculation section 162 calculates a voltage phase θv based on the d-axis voltage command Vd*, the q-axis voltage command Vq*, the rotation position θ, the rotation speed ωr, and the carrier wave frequency fc, as expressed by equations (1) to (4) below.

$$\theta v = \theta + \varphi v + \varphi dqv + 0.5\pi \quad (1)$$

$$\varphi v = \omega r \cdot 1.5 Tc \quad (2)$$

$$Tc = 1/fc \quad (3)$$

$$\varphi dqv = a\tan(Vq/Vd) \quad (4)$$

Here, φv represents a calculation delay compensation value for the voltage phase, Tc represents the cycle of the carrier wave, and φdqv represents the voltage phase from the d-axis. The calculation delay compensation value φv is configured to compensate for occurrence of the calculation delay of 1.5 control cycles during a period from when the rotation position detector 41 acquires the rotation position θ until when the motor control device 1 outputs the gate signal to the inverter 3. In this embodiment, 0.5 π is added in a fourth term on a right side of the equation (1). Here, the voltage phase calculated in first to third terms on the right side of the equation (1) is a cos wave, so that the calculation is made to convert the viewpoint of the cos wave to that of a sin wave.

The modulation rate calculation section 163 calculates a modulation rate H based on the d-axis voltage command Vd*, the q-axis voltage command Vq*, and the power supply voltage Hvdc, by following an equation (5) below. The modulation rate H represents a voltage amplitude ratio between the DC power supplied from the high voltage battery 5 to the inverter 3 and the AC power outputted from the inverter 3 to the motor 2.

$$H = \sqrt{(Vd^2 + Vq^2)}/(Hvdc/2) \quad (5)$$

The voltage phase error calculation section 164 calculates a voltage phase error Δθv and the carrier wave phase difference Δθcarr based on the synchronous PWM carrier wave number Nc that the synchronous PWM carrier wave number selection section 161 has selected, the voltage phase θv that the voltage phase calculation section 162 has calculated, the modulation rate H that the modulation rate calculation section 163 has calculated, the rotation speed ωr, and the torque command T*. The voltage phase error Δθv represents a phase difference between the three-phase voltage commands Vu*, Vv*, and Vw*, i.e., the voltage commands for the inverter 3, and the triangular wave signal Tr, i.e., the carrier wave used in the pulse width modulation. The voltage phase error calculation section 164 calculates the voltage phase error Δθv every calculation cycle predetermined. With this configuration, the carrier wave frequency adjusting unit 16 adjusts the frequency of the triangular wave signal Tr to change the phase difference between the voltage command for the inverter 3 and the carrier wave used in the pulse width modulation. The carrier wave phase difference Δθcarr also represents a phase difference between the reference voltage phase θvb and the triangular wave signal Tr. As has been described above, the reference voltage phase θvb represents the reference value of the phase of the carrier wave in the synchronous PWM control. Accordingly, the carrier wave phase difference Δθcarr corresponds to the phase of the triangular wave signal Tr in the synchronous PWM control.

The synchronous carrier wave frequency calculation section 165 calculates a synchronous carrier wave frequency fcs based on the voltage phase error Δθv that the voltage phase error calculation section 164 has calculated, the rotation speed ωr, and the synchronous PWM carrier wave number Nc that the synchronous PWM carrier wave number selection section 161 has selected, by following an equation (6) below.

$$fcs = \omega r \cdot Nc \cdot (1 + \Delta\theta v \cdot K)/(2\pi) \tag{6}$$

The synchronous carrier wave frequency calculation section 165 calculates the synchronous carrier wave frequency fcs expressed by the equation (6) based on, for example, phase locked loop (PLL) control. In the equation (6), a gain K may be a constant value or may be variable in some condition.

The carrier wave frequency setting section 166 selects, based on the rotation speed ωr, any one of an asynchronous carrier wave frequency fcns and the synchronous carrier wave frequency fcs that the synchronous carrier wave frequency calculation section 165 has calculated, and outputs the selected one as the carrier wave frequency fc. The asynchronous carrier wave frequency fcns is a constant value predetermined in the carrier wave frequency setting section 166. Here, the asynchronous carrier wave frequency fcns may be prepared in plurality, any one of which may be selected in accordance with the rotation speed ωr. For example, the carrier wave frequency setting section 166 may select the asynchronous carrier wave frequency fcns such that, as the value of the rotation speed ωr is greater, the value of the asynchronous carrier wave frequency fcns is greater, and may output the selected one as the carrier wave frequency fc.

Next, a method to calculate the voltage phase error Δθv in the voltage phase error calculation section 164 of the carrier wave frequency adjusting unit 16 will be described in detail.

Figure 4:
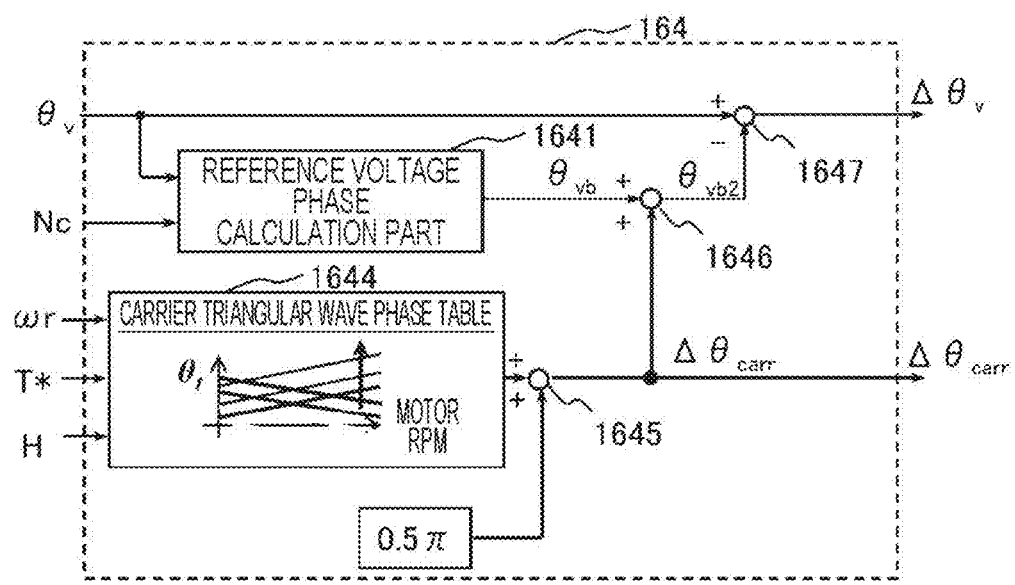
FIG. 4 is a block diagram of a voltage phase error calculation section according to the first embodiment of the present invention.

FIG. 4 is a block diagram of the voltage phase error calculation section 164 according to the first embodiment of the present invention. The voltage phase error calculation section 164 includes a reference voltage phase calculation part 1641, a carrier triangular wave phase table 1644, a voltage phase difference conversion part 1645, an addition part 1646, and a subtraction part 1647.

The reference voltage phase calculation part 1641 calculates the reference voltage phase θvb to fix the phase of the carrier wave in the synchronous PWM control, based on the synchronous PWM carrier wave number Nc and the voltage phase θv. The reference voltage phase calculation part 1641 calculates the reference voltage phase θvb, so that the cycle of the carrier wave with respect to the voltage phase θv matches the cycle of the electromagnetic excitation force or the torque pulsation generated in the motor 2 by the fundamental wave current.

Figure 5:
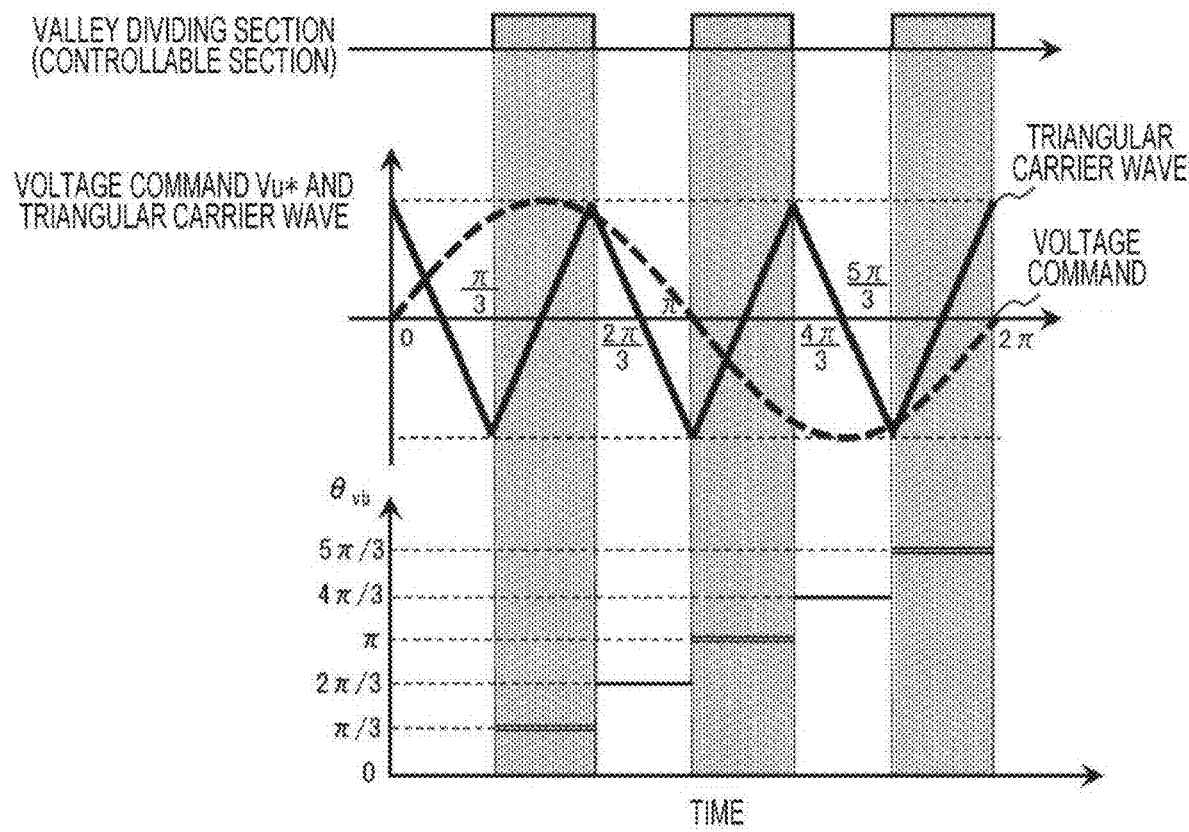
FIG. 5 is a schematic diagram of calculating reference voltage phase in the present invention.

FIG. 5 is a schematic diagram where the reference voltage phase calculation part 1641 calculates the reference voltage phase. The reference voltage phase calculation part 1641 calculates the reference voltage phase θvb that changes stepwise in the number of steps corresponding to the synchronous PWM carrier wave number Nc between, for example, 0 and 2π as illustrated in FIG. 5. Here, in order to facilitate understanding of the description, FIG. 5 illustrates an example where the synchronous PWM carrier wave number Nc is 3, but in an actual condition, the synchronous PWM carrier wave number Nc is preferably 3, 9, or 15, as has been previously described. Alternatively, the synchronous PWM carrier wave number Nc may be 6 or 12.

In this embodiment, in order to reduce the processing load, as illustrated in FIG. 5 for example, the carrier wave frequency adjusting unit 16 may adjust the frequency of the carrier wave only in a "valley dividing section" as a section where the carrier wave as the triangular wave rises from a minimum value (valley) to a maximum value (peak). In this case, as will be described later, the synchronous carrier wave frequency calculation section 165 sequentially calculates the synchronous carrier wave frequency fcs based on the voltage phase error Δθv in the valley dividing section of the carrier wave, so as to perform the synchronous PWM control. The reference voltage phase calculation part 1641 calculates the reference voltage phase θvb, which is to be used for calculating the voltage phase error Δθv, as a discrete value that changes at θvery n/3 interval as illustrated in FIG. 5. Here, the reference voltage phase θvb changes at an interval according to the synchronous PWM carrier wave number Nc. As the synchronous PWM carrier wave number Nc increases, the reference voltage phases θvb changes at a smaller interval.

Specifically, the reference voltage phase calculation part 1641 calculates the reference voltage phase θvb based on the voltage phase θv and the synchronous PWM carrier wave number Nc, by following equations (7) to (8) below.

$$\theta vb = \text{int}(\theta v/\theta s) \cdot \theta s + 0.5\theta s \tag{7}$$

$$\theta s = 2\pi/Nc \tag{8}$$

Here, θs represents a change width of the voltage phase θv per carrier wave, and int represents a round down calculation after decimal point.

In this embodiment, the reference voltage phase calculation part 1641 calculates the reference voltage phase θvb by following the equations (7) to (8), so that the reference voltage phase θvb becomes 0 rad in a "peak dividing section" as a section where the carrier wave as the triangular wave falls from the maximum value (peak) to the minimum value (valley). However, a period, during which the reference voltage phase θvb becomes 0 rad, is not limited to the peak dividing section. As long as the reference voltage phase calculation part 1641 calculates, based on the voltage phase θv, the reference voltage phase θvb that changes stepwise in the number of steps corresponding to the synchronous PWM carrier wave number Nc between 0 and 2π, the reference voltage phase calculation part 1641 may calculate the reference voltage phase θvb by following other equations than the equations (7) to (8).

The carrier triangular wave phase table 1644 indicates a phase difference for reducing the electromagnetic excitation force or the torque pulsation in the motor 2. The phase difference here means the phase difference with respect to the reference voltage phase θvb. The carrier triangular wave phase table 1644 is set for each of a plurality of values in accordance with the rotation speed ωr, the torque command T\*, and the modulation rate H. The voltage phase error calculation section 164 refers to the carrier triangular wave phase table 1644 based on the rotation speed ωr, the torque command T\*, and the modulation rate H, so as to specify the phase difference suitable to reduce the electromagnetic excitation force or the torque pulsation.

Here, data for the phase difference with respect to the reference voltage phase θvb, the phase difference suitable to reduce the electromagnetic excitation force or the torque pulsation, is previously acquired for each of the rotation speed ωr, the torque command T\*, and the modulation rate H by, for example, simulation, actual measurements, or others. The carrier triangular wave phase table 1644 is set based on the data for the phase difference previously acquired. Here, the carrier triangular wave phase table 1644 is set for each of the modulation rates H, so as to compensate that a dominant order of the electromagnetic excitation force or the torque pulsation (generated by the harmonic current) changes in accordance with the corresponding modulation rate H. The phase difference outputted based on the carrier triangular wave phase table 1644 may be any one of a current phase difference and a voltage phase difference. In this embodiment, the phase difference outputted from the carrier triangular wave phase table 1644 corresponds to the current phase difference, and the voltage phase difference conversion part 1645 at the subsequent stage is configured to convert the current phase difference to the voltage phase difference.

The voltage phase difference conversion part 1645 adds 0.5 π to the current phase difference inputted from the carrier triangular wave phase table 1644, so as to convert the current phase difference to the voltage phase difference. The voltage phase difference conversion part 1645 adds 0.5 π for the reason that, with the harmonic current that is less susceptible to resistance than the fundamental wave current, a differential value (+0.5 π) of the harmonic current flowing through an inductance component of the motor 2 mainly affects the voltage of the motor 2. Note that, as has been previously described, when the phase difference outputted from the carrier triangular wave phase table 1644 corresponds to the voltage phase difference, the voltage phase difference conversion part 1645 is not necessarily included here.

When the voltage phase difference has been determined based on the rotation speed ωr, the torque command T* and the modulation rate H, with reference to the carrier triangular wave phase table 1644, the voltage phase error calculation section 164 outputs the voltage phase difference as the carrier wave phase difference Δθcarr described above.

With this configuration, the carrier wave frequency adjusting unit 16 obtains, based on the reference voltage phase θvb, the carrier wave phase difference Δθcarr indicating the phase of the triangular wave signal Tr. Then, the carrier wave frequency adjusting unit 16 outputs the carrier wave phase difference Δθcarr to the current control unit 14.

The addition part 1646 adds the voltage phase difference (that the voltage phase difference conversion part 1645 has calculated) to the reference voltage phase θvb (that the reference voltage phase calculation part 1641 has calculated), and calculates a corrected reference voltage phase θvb2 for reducing the electromagnetic excitation force or the torque pulsation generated by the harmonic current.

The subtraction part 1647 subtracts the corrected reference voltage phase θvb2 from the voltage phase θv to calculate the voltage phase error Δθv.

The voltage phase error calculation section 164 calculates the voltage phase error Δθv and the carrier wave phase difference Δθcarr as has been described above. As a result, the voltage phase error Δθv is determined based on the rotation speed ωr, the torque command T*, and the modulation rate H such that the torque pulsation or the electromagnetic excitation force (generated by the fundamental wave current in accordance with the three-phase voltage commands Vu*, Vv*, and Vw*) is canceled by the torque pulsation or the electromagnetic excitation force (generated by the carrier wave used in the pulse width modulation). Accordingly, the carrier wave frequency fc is set in a manner that the phase difference between the voltage command for the inverter 3 and the carrier wave used in the pulse width modulation is changed to reduce the torque pulsation or the electromagnetic excitation force generated in the motor 2.

The carrier wave frequency adjusting unit 16 may perform the processing above when the motor 2 is in either a power drive mode or a regenerative drive mode. The torque command T* is a positive value in the power drive mode, and the torque command T* is a negative value in the regenerative drive mode. Here, the carrier wave frequency adjusting unit 16 determines whether the motor 2 is in the power drive mode or in the regenerative drive mode based on the value of the torque command T*, and based on the determination, the voltage phase error calculation section 164 performs the calculation described above. Accordingly, the carrier wave frequency fc is set such that the voltage phase error Δθv is changed to reduce the torque pulsation or the electromagnetic excitation force generated in the motor 2.

Next, an operation of the current control unit 14 in the motor control device 1 will be described. As has been described above, the motor control device 1 according to this embodiment has the feature in the method where the current control unit 14 calculates the d-axis voltage command Vd* and the q-axis voltage command Vq* in the control of the overmodulation, and details thereof will be described below.

First, a modulation wave Vmod and a carrier wave Vcar are respectively defined as in equations (9) and (10). In the equation (9), the modulation wave Vmod is defined in a third-order harmonic wave injection system where a third-order harmonic component is superimposed on a fundamental wave component. The fundamental wave component in the modulation wave Vmod corresponds to the three-phase voltage commands Vu*, Vv*, and Vw* outputted from the dq/three-phase voltage command conversion unit 15 and inputted to the gate signal generation unit 18. The gate signal generation unit 18 compares the modulation wave Vmod with the carrier wave Vcar to perform the pulse width modulation. In the equation (10), the triangular wave signal Tr generated by the triangular wave generation unit 17 is defined as the carrier wave Vcar.

$$V\mathrm{mod} = E \times \sin(\omega t) + E/6 \times \sin(3\omega t) \quad (9)$$

$$V\mathrm{car} = \sin(Nc \times \omega t + \Delta\theta\mathrm{carr}) \quad (10)$$

E: gain of the voltage command
ω: electric angular frequency
t: time

Figure 6:
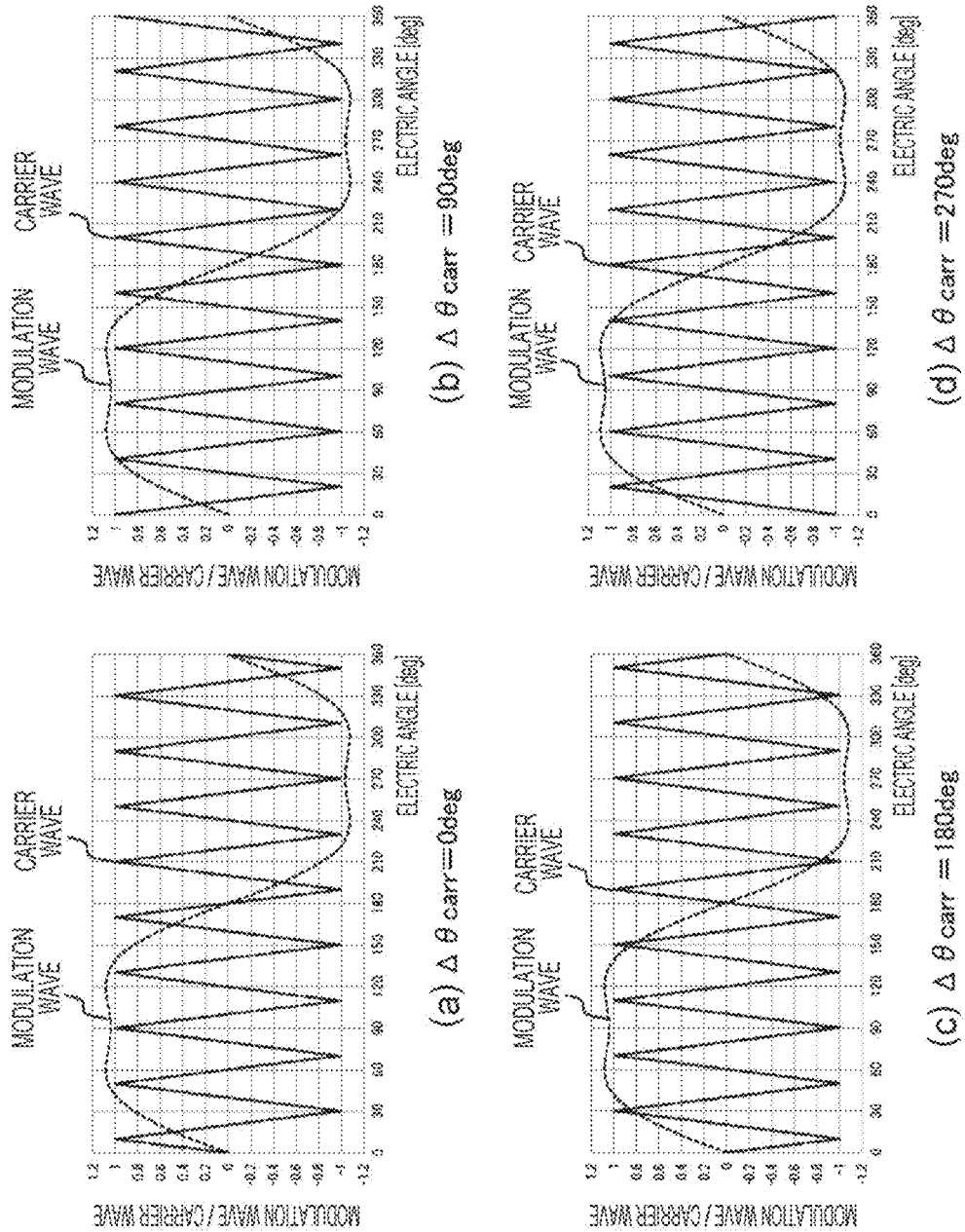
FIG. 6 is diagram illustrating a relationship between a modulation wave and a carrier wave at a modulation rate of 1.25 (over modulation).

FIG. 6 is a diagram illustrating a relationship between the modulation wave Vmod and the carrier wave Vcar at the modulation rate of 1.25 (overmodulation). In FIG. 6, (a) illustrates the relationship between the modulation wave Vmod and the carrier wave Vcar when the carrier wave phase difference Δθcarr is 0 degree; (b) illustrates the relationship between the modulation wave Vmod and the carrier wave Vcar when the carrier wave phase difference Δθcarr is 90 degrees; (c) illustrates the relationship between the modulation wave Vmod and the carrier wave Vcar when the carrier wave phase difference Δθcarr is 180 degrees; and (d) illustrates the relationship between the modulation wave Vmod and the carrier wave Vcar when the carrier wave phase difference Δθcarr is 270 degrees.

Figure 7:
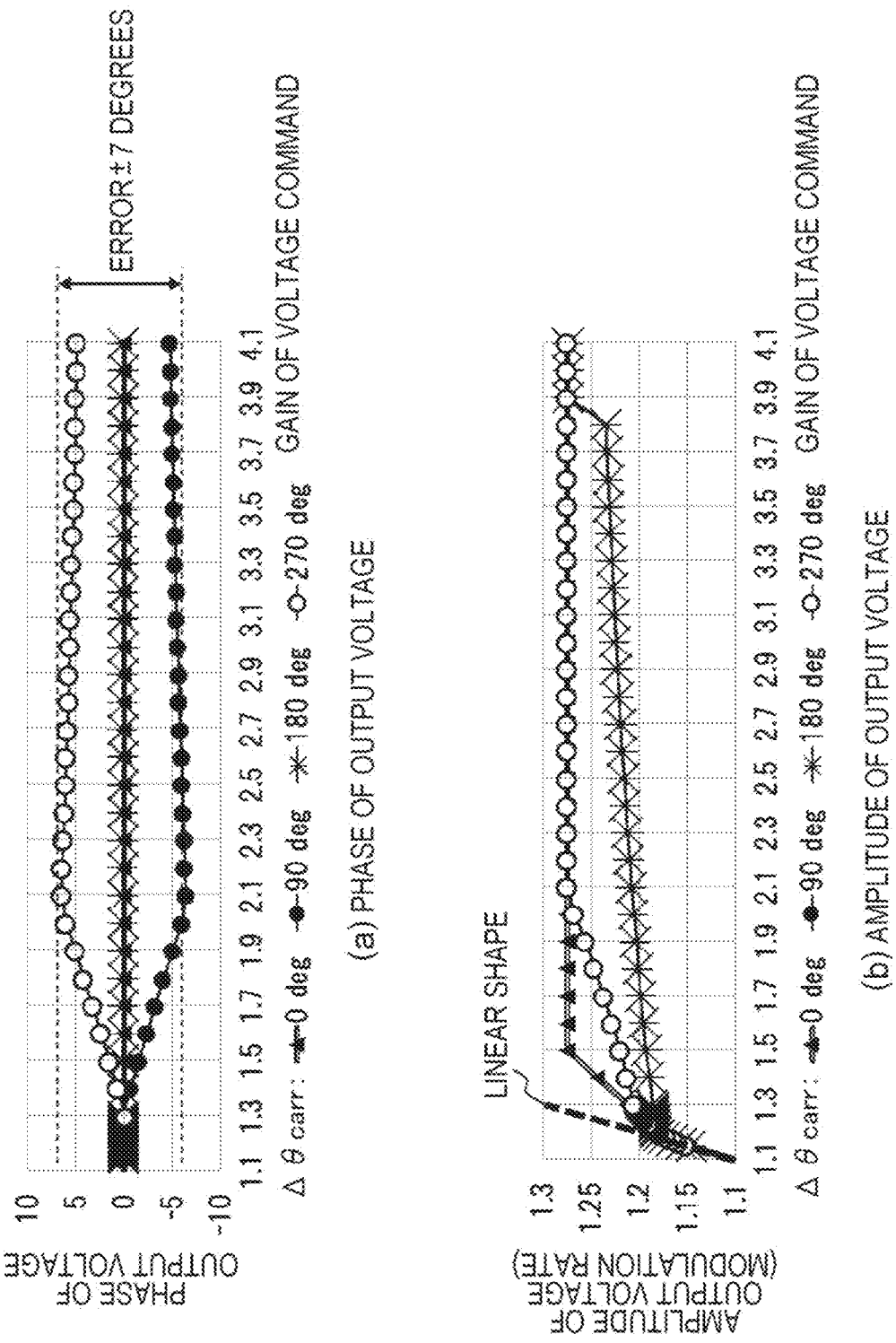
FIG. 7 is a diagram illustrating a relationship between a gain of the voltage command and voltage outputted from an inverter.

FIG. 7 is a diagram illustrating a relationship between the gain E of the voltage command and the voltage outputted from the inverter 3. In FIG. 7, (a) illustrates the relationship between the gain E of the voltage command and a phase of the voltage outputted from the inverter 3 when the carrier wave phase difference Δθcarr is 0 degree, 90 degrees, 180 degrees, or 270 degrees, in other words, in each case of FIGS. 6(a) to 6(d). In FIG. 7, (b) illustrates the relationship between the gain E of the voltage command and an amplitude of the voltage outputted from the inverter 3 when the carrier wave phase difference Δθcarr is 0 degree, 90 degrees, 180 degrees, or 270 degrees, in other words, in each case of FIGS. 6(a) to 6(d). The phase of the voltage outputted from the inverter 3 illustrated in FIG. 7(a) is based on the phase of the modulation wave Vmod, and corresponds to a phase difference between the modulation wave Vmod and the voltage outputted from the inverter 3. Additionally, the amplitude of the voltage outputted from the inverter 3 illustrated in FIG. 7(b) is based on the power supply voltage Hvdc, and corresponds to the modulation rate.

As seen in FIG. 7, the relationship between the gain E of the voltage command and the voltage (three-phase AC voltages Vu, Vv, and Vw) outputted from the inverter 3 changes in accordance with the value of the carrier wave phase difference Δθcarr. In FIG. 7(a), the phase of the voltage outputted from the inverter 3 should be 0 degree (no change) regardless of the value of the gain E of the voltage command, but fluctuates within a range of ±7 degrees when the carrier wave phase difference Δθcarr is 90 degrees or 270 degrees. The phase of the voltage outputted from the inverter 3 is more prone to fluctuate during the overmodulation where the modulation rate exceeds 1.15. In FIG. 7(b), the amplitude of the voltage outputted from the inverter 3 should linearly change at constant inclination in proportion to the gain E of the voltage command, but the inclination changes during the overmodulation where the modulation rate exceeds 1.15, and the inclination varies in accordance with the carrier wave phase difference Δθcarr.

In the motor control device 1 of this embodiment, in order to reduce errors in the amplitude and the phase of the voltage outputted from the inverter 3 that vary in accordance with the value of the carrier wave phase difference Δθcarr as has been described above, the current control unit 14 corrects the amplitudes and the phases of the d-axis voltage command Vd* and the q-axis voltage command Vq* based on the value of the carrier wave phase difference Δθcarr during the overmodulation. With this configuration, it is possible to appropriately control the motor during the overmodulation. The details thereof will be described below with reference to FIGS. 8 to 11.

Figure 8:
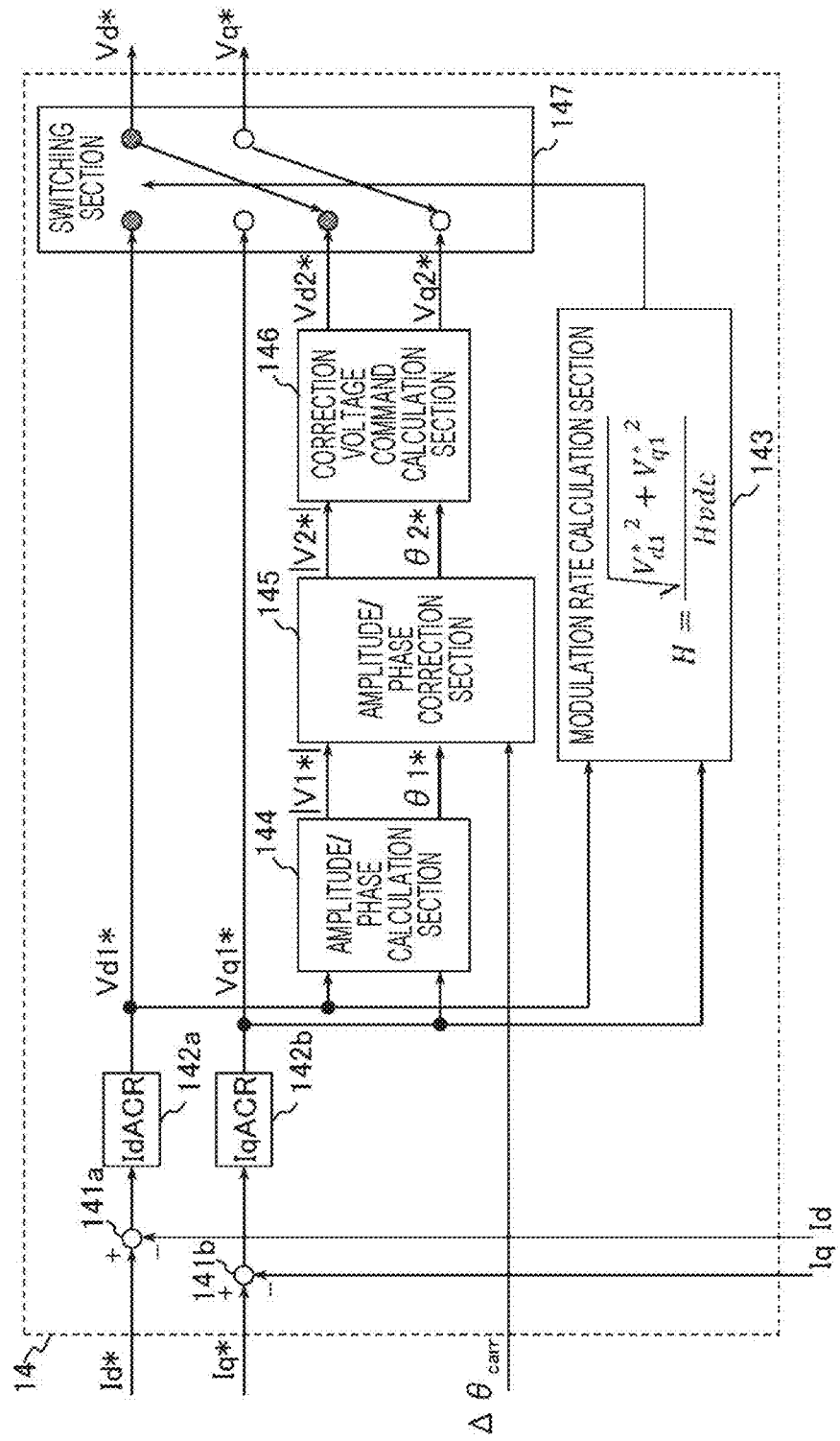
FIG. 8 is a block diagram of a current control unit according to the first embodiment of the present invention.

FIG. 8 is a block diagram of the current control unit 14 according to the first embodiment of the present invention. The current control unit 14 includes a subtraction section 141a, a subtraction section 141b, a d-axis current control section 142a, a q-axis current control section 142b, a modulation rate calculation section 143, an amplitude/phase calculation section 144, an amplitude/phase correction section 145, a correction voltage command calculation section 146, and a switching section 147.

The subtraction section 141a obtains a deviation between the d-axis current command Id* outputted from the current command generation unit 11 and a d-axis current Id outputted from the three-phase/dq conversion current control unit 13. Concurrently, the subtraction section 141b obtains a deviation between the q-axis current command Id* outputted from the current command generation unit 11 and the q-axis current Iq outputted from the three-phase/dq conversion current control unit 13.

The d-axis current control section (IdACR) 142a calculates a first d-axis voltage command Vd1* on a dq coordinate axis such that the current deviation calculated by the subtraction section 141a becomes 0. Concurrently, the q-axis current control section (IqACR) 142b calculates a first q-axis voltage command Vq1* on the dq coordinate axis such that the current deviation calculated by the subtraction section 141b becomes 0.

The modulation rate calculation section 143 calculates the modulation rate H based on the d-axis voltage command Vd*, the q-axis voltage command Vq*, and the power supply voltage Hvdc, by following an equation (11) (=the equation (5)) below. As has been described above, the modulation rate H represents the voltage amplitude ratio between the DC power supplied from the high voltage battery 5 to the inverter 3 and the AC power outputted from the inverter 3 to the motor 2.

$$H=\sqrt{(Vd^{*2}+Vq^{*2})}/(Hvdc/2) \qquad (11)$$

The amplitude/phase calculation section 144 calculates a first voltage amplitude |V1*| and a first voltage phase θ1* based on the first d-axis voltage command Vd1* that the d-axis current control section 142a has calculated and the first q-axis voltage command Vq1* that the q-axis current control section 142b has calculated, by following equations (12) and (13) below.

$$|V1^*|=\sqrt{(Vd1^{*\wedge}2+Vq1^{*\wedge}2)} \qquad (12)$$

$$\theta1^*=a\tan(Vq1^*/-Vd1^*) \qquad (13)$$

The amplitude/phase correction section 145 corrects each of the first voltage amplitude |V1*| and the first voltage phase θ1* that the amplitude/phase calculation section 144 has calculated, based on the carrier wave phase difference Δθcarr inputted from the carrier wave frequency adjusting unit 16, so as to calculate a second voltage amplitude |V2*| and a second voltage phase θ2*. For example, the amplitude/phase correction section 145 stores, as correction map information, a relationship between the first voltage amplitude |V1*| and the second voltage amplitude |V2*| and a relationship between the first voltage phase θ1* and the second voltage phase θ2*, each previously calculated based on various values of the carrier wave phase difference Δθcarr. Specifically, the correction map information is previously created and stored in the amplitude/phase correction section 145, such that differences respectively fall within predetermined ranges, the differences between: the amplitudes and the phases of the three-phase AC voltages Vu, Vv, and Vw outputted from the inverter 3 when the voltage phase error Δθv is constant, the amplitudes and the phases calculated based on the first d-axis voltage command Vd1* and the first q-axis voltage command Vq1*; and the amplitudes and the phases of the three-phase AC voltages Vu, Vv, and Vw outputted from the inverter 3 when the voltage phase error Δθv is changed in the voltage phase error calculation section 164, the amplitudes and the phases calculated based on a second d-axis voltage command Vd2* and a second q-axis voltage command Vq2* determined in accordance with the second voltage amplitude |V2*| and the second voltage phase θ2*. Then, when the correction map information stored previously is map-searched based on the carrier wave phase difference Δθcarr, the first voltage amplitude |V1*|, and the first voltage phase θ1* inputted, the second voltage amplitude |V2*| and the second voltage phase θ2* are to be calculated.

Figure 9:
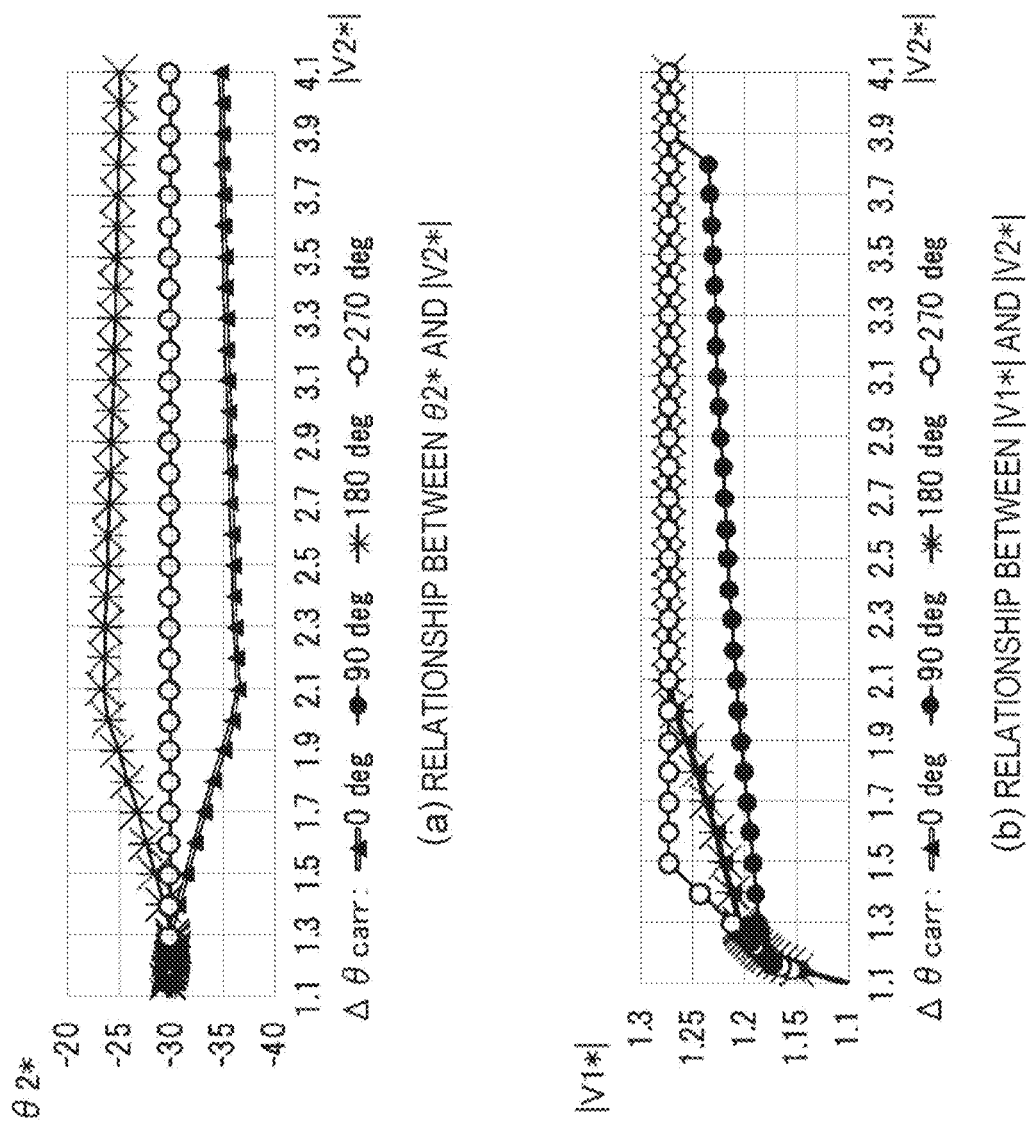
FIG. 9 is a diagram illustrating, at a first voltage phase of 30 degrees, a relationship between a second voltage amplitude and a first voltage amplitude, and a relationship between the second voltage amplitude and a second voltage phase.
Figure 10:
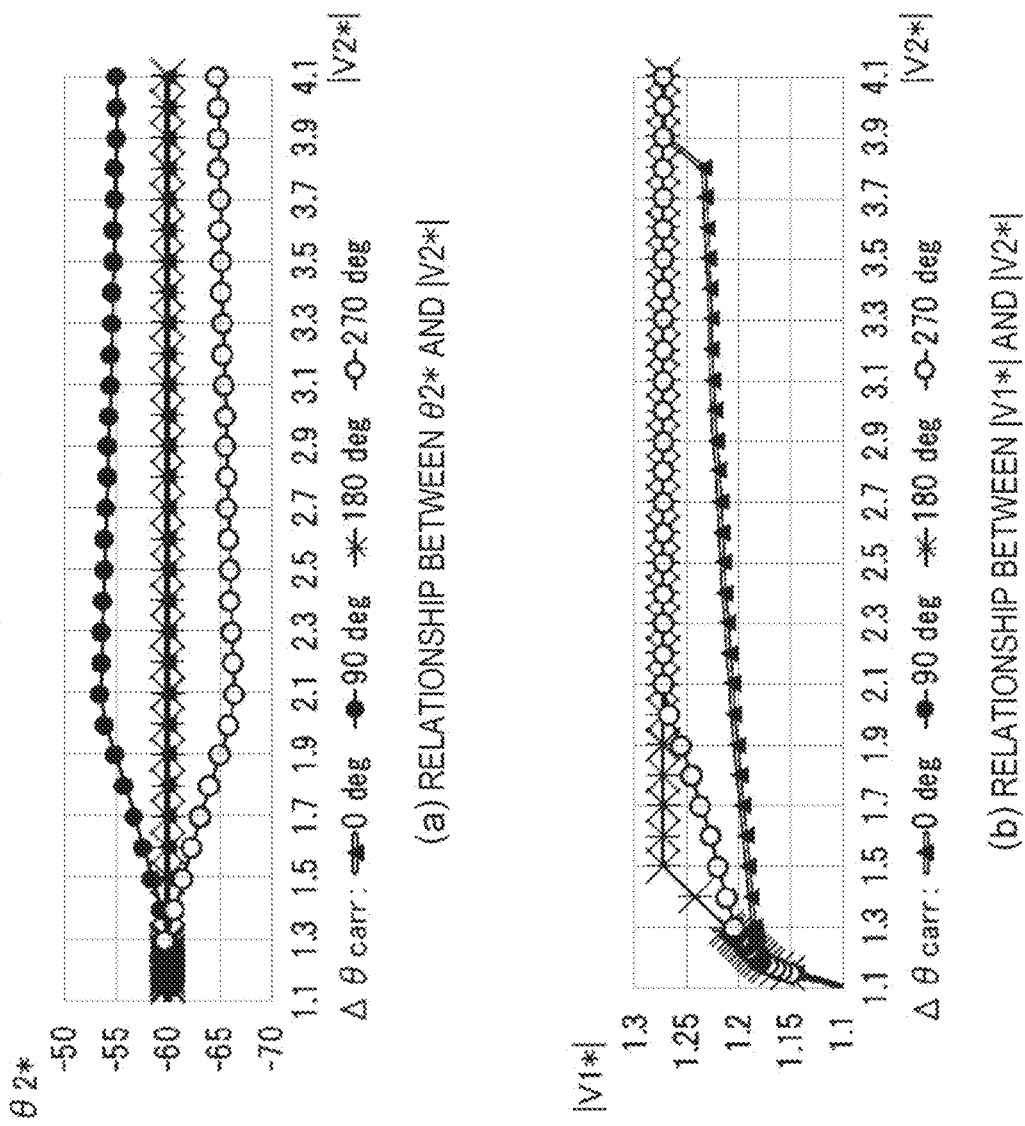
FIG. 10 is a diagram illustrating, at the first voltage phase of 60 degrees, the relationship between the second voltage amplitude and the first voltage amplitude, and the relationship between the second voltage amplitude and the second voltage phase.
Figure 11:
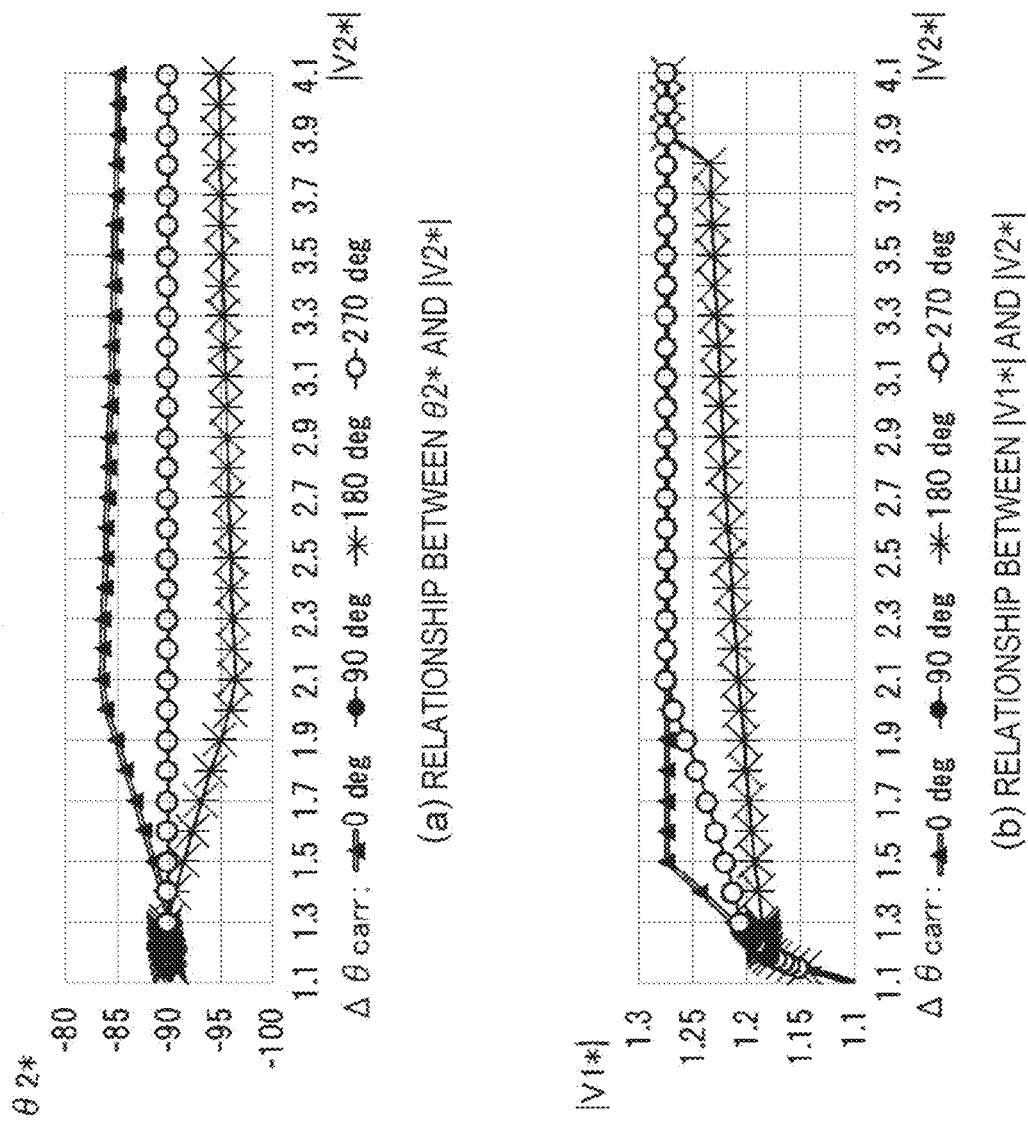
FIG. 11 is a diagram illustrating, at the first voltage phase of 90 degrees, the relationship between the second voltage amplitude and the first voltage amplitude, and the relationship between the second voltage amplitude and the second voltage phase.

Each of FIGS. 9, 10, and 11 illustrates the relationship between the second voltage amplitude |V2*| and the first voltage amplitude |V1*| and a relationship between the second voltage amplitude |V2*| and the second voltage phase θ2* when the first voltage phase θ1* is 30 degrees, 60 degrees, or 90 degrees. Specifically, FIG. 9(a) illustrates the relationship between the second voltage amplitude |V2*| and the second voltage phase θ2* when the first voltage phase θ1* is 30 degrees and the carrier wave phase difference Δθcarr is 0 degree, 90 degrees, 180 degrees, or 270 degrees. FIG. 9(b) illustrates the relationship between the second voltage amplitude |V2*| and the first voltage amplitude |V1*| when the first voltage phase θ1* is 30 degrees and the carrier wave phase difference Δθcarr is 0 degree, 90 degrees, 180 degrees, or 270 degrees. FIG. 10(a) illustrates the relationship between the second voltage amplitude |V2*| and the second voltage phase θ2* when the first voltage phase θ1* is 60 degrees and the carrier wave phase difference Δθcarr is 0 degree, 90 degrees, 180 degrees, or 270 degrees. FIG. 10(b) illustrates the relationship between the second voltage amplitude |V2*| and the first voltage amplitude |V1*| when the first voltage phase θ1* is 60 degrees and the carrier wave phase difference Δθcarr is 0 degree, 90 degrees, 180 degrees, or 270 degrees. FIG. 11(a) illustrates the relationship between the second voltage amplitude |V2*| and the second voltage phase θ2* when the first voltage phase θ1* is 90 degrees and the carrier wave phase difference Δθcarr is 0 degree, 90 degrees, 180 degrees, or 270 degrees. FIG. 11(b) illustrates the relationship between the second voltage amplitude |V2*| and the first voltage amplitude |V1*| when the first voltage phase θ1* is 90 degrees and the carrier wave phase difference Δθcarr is 0 degree, 90 degrees, 180 degrees, or 270 degrees. Note that, in FIGS. 9, 10, and 11, the first voltage amplitude |V1*| and the second voltage amplitude |V2*| are all standardized based on definition of the modulation rate.

Based on the relationships between the second voltage amplitude |V2*| and the first voltage amplitude |V1*| and the relationships between the second voltage amplitude |V2*| and the second voltage phase θ2* illustrated in FIGS. 9 to 11, the amplitude/phase correction section 145 obtains the second voltage amplitude |V2*| and the second voltage phase θ2*, for example, as follows.

First, the amplitude/phase correction section 145 selects any one of FIGS. 9 to 11 based on a value of the first voltage phase θ1* inputted. In other words, the amplitude/phase correction section 145 selects FIG. 9 when the first voltage θ1* is 30 degrees, FIG. 10 when the first voltage θ1* is 60 degrees, and FIG. 11 when the first voltage θ1* is 90 degrees. Here, the value of the first voltage phase θ1* is arranged in increments of 30 degrees, in accordance with which any one of FIGS. 9 to 11 is selected. Note that, even when the value of the first voltage phase θ1* is arranged in increments of any other degrees than 30 degrees, the same method may still be applied. In this case, the amplitude/phase correction section 145 may previously store the relationship between the second voltage amplitude |V2*| and the first voltage amplitude |V1*| and the relationship between the second voltage amplitude |V2*| and the second voltage phase θ2* in accordance with the increments of the first voltage phase θ1*, and select any one of FIGS. 9 to 11 in correspondence to the value of the first voltage phase θ1*.

When having selected any one of FIGS. 9 to 11, the amplitude/phase correction section 145 refers to the corresponding one of FIGS. 9 to 11, and obtains values of the second voltage amplitude |V2*| and the second voltage phase θ2* in correspondence to the values of the carrier wave phase difference Δθcarr and the first voltage amplitude |V1*| inputted. For example, when the first voltage phase θ1* is 30 degrees and FIG. 9 is selected, the relationship between the first voltage amplitude |V1*| and the second voltage amplitude |V2*| in correspondence to the value of the carrier wave phase difference Δθcarr is selected in FIG. 9(b), and based on the relationship, the value of the second voltage amplitude |V2*| in correspondence to the value of the first voltage amplitude |V1*| is obtained. Then, the relationship between the second voltage phase θ2* and the second voltage amplitude |V2*| in correspondence to the value of the carrier wave phase difference Δθcarr is selected in FIG. 9(a), and based on the relationship, the value of the second voltage phase θ2* in correspondence to the value of the second voltage amplitude |V2*| that has been obtained in FIG. 9(b) is obtained. With this configuration, the second voltage amplitude |V2*| and the second voltage phase θ2* are obtained.

The amplitude/phase correction section 145 follows the method described above to obtain the values of the second voltage amplitude |V2*| and the second voltage phase θ2*, so as to correct the first voltage amplitude |V1*| and the first voltage phase θ1* based on the carrier wave phase difference Δθcarr inputted from the carrier wave frequency adjusting unit 16, and calculate the second voltage amplitude |V2*| and the second voltage phase θ2*. Here, in FIGS. 9 to 11, the value of the carrier wave phase difference Δθcarr is arranged in increments of 90 degrees, based on which the relationship between the second voltage amplitude |V2*| and the first voltage amplitude |V1*| and the relationship between the second voltage amplitude |V2*| and the second voltage phase θ2* are illustrated.

Alternatively, the carrier wave phase difference Δθcarr may be arranged in increments of any other degrees than 90 degrees. With the increments of smaller degrees, the second voltage amplitude |V2*| and the second voltage phase θ2* are more accurate.

The correction voltage command calculation section 146 calculates the second d-axis voltage command Vd2* and the second q-axis voltage command Vq2* based on the second voltage amplitude |V2*| and the second voltage phase θ2* that the amplitude/phase correction section 145 has obtained, by following equations (14) and (15) below.

$$Vd1^* = -|V2^*|\sin θ2^* \qquad (14)$$

$$Vq1^* = |V2^*|\cos θ2^* \qquad (15)$$

Based on the value of the modulation rate H that the modulation rate calculation section 143 has calculated, the switching section 147 selects any one of combinations as follows: a combination of the first d-axis voltage command Vd1* and the first q-axis voltage command Vq1* that the d-axis current control section 142a and the q-axis current control section 142b have respectively calculated, or a combination of the second d-axis voltage command Vd2* and the second q-axis voltage command Vq2* that the correction voltage command calculation section 146 has calculated. Then, the combination of the d-axis voltage command and the q-axis voltage command that the switching section 147 has selected is outputted as the d-axis voltage command Vd* and the q-axis voltage command Vq* that the current control unit 14 has calculated. Specifically, when the value of the modulation rate H is equal to or smaller than, for example, 1.15, the combination of the first d-axis voltage command Vd1* and the first q-axis voltage command Vq1* is selected to be outputted; and when the value of the modulation rate H is greater than 1.15, the combination of the first d-axis voltage command Vd1* and the first q-axis voltage command Vq1* is switched to the combination of the second d-axis voltage command Vd2* and the second q-axis voltage command Vq2*. In this state, a change rate of the voltage command before and after the switching process may be restricted to a constant value or less, so that the switching process does not cause shock in the voltage outputted from the inverter 3. Additionally, the modulation rate H (based on which the switching section 147 switches the selection) may be set at different values between when the modulation rate increases and when the modulation rate H decreases. With this configuration, hysteresis is provided in the switching section 147 to prevent chattering.

Further, when the modulation rate H is smaller than 1.15, the amplitude and the phase of the voltage outputted from the inverter 3 slightly varies in accordance with the value of the carrier wave phase difference $\Delta\theta$carr. Thus, in this case too, the errors in the amplitude and the phase of the voltage outputted from the inverter 3 may be reduced with the configuration described above.

As has been described above, with the modulation rate H at the predetermined value, for example, 1.15 or more, the current control unit 14 selects, instead of the first d-axis voltage command Vd1* and the first q-axis voltage command Vq1* that the d-axis current control section 142a and the q-axis current control section 142b have respectively calculated, the second d-axis voltage command Vd2* and the second q-axis voltage command Vq2* that the correction voltage command calculation section 146 has calculated. Then, the current control unit 14 outputs the second d-axis voltage command Vd2* and the second q-axis voltage command Vq2* as the d-axis voltage command Vd* and the q-axis voltage command Vq*. In this state, the correction voltage command calculation section 146 calculates the second d-axis voltage command Vd2* and the second q-axis voltage command Vq2* in accordance with the second voltage amplitude |V2*| and the second voltage phase 2* that the amplitude/phase correction section 145 has obtained based on the carrier wave phase difference $\Delta\theta$carr representing the phase of the triangular wave signal Tr (the carrier wave). With this configuration, the amplitudes and the phases of the d-axis voltage command Vd* and the q-axis voltage command Vq* are respectively corrected based on the carrier wave phase difference $\Delta\theta$carr, so that the errors in the amplitude and the phase of the voltage outputted from the inverter 3, the errors caused when the voltage phase error $\Delta\theta$v is changed, are respectively reduced to fall within the predetermined ranges.

The configurations in the first embodiment of the present invention described above are effective as follows:

(1) Provided is the motor control device 1 connected to the inverter 3 that performs the power conversion from the DC power to the AC power, and configured to control the drive of the motor 2 driven with the AC power.

The motor control device 1 includes:
the current control unit 14 configured to generate the d-axis voltage command Vd* and the q-axis voltage command Vq* in accordance with the torque command T*;
the triangular wave generation unit 17 configured to generate the triangular wave signal Tr as the carrier wave;
the carrier wave frequency adjusting unit 16 configured to adjust the carrier wave frequency fc as the frequency of the triangular wave signal Tr; and
and the gate signal generation unit 18 configured to perform the pulse width modulation of the three-phase voltage commands Vu*, Vv*, and Vw* based on the triangular wave signal Tr, so as to generate the gate signal to control the operation of the inverter 3. The carrier wave frequency adjusting unit 16 adjusts the carrier wave frequency fc to change the voltage phase error $\Delta\theta$v as the phase difference between the three-phase voltage commands Vu*, Vv*, and Vw* and the triangular wave signal Tr. When the modulation rate H in accordance with the voltage amplitude ratio between the DC power supplied from the high voltage battery 5 to the inverter 3 and the AC power outputted from the inverter 3 to the motor 2 exceeds the predetermined value, e.g., 1.15, the current control unit 14 corrects the amplitudes and phases of the d-axis voltage command Vd* and the q-axis voltage command Vq* based on the carrier wave phase difference $\Delta\theta$carr representing the phase of the triangular wave signal Tr. With this configuration, it is possible to appropriately control the motor during the overmodulation.

(2) The current control unit 14 corrects the amplitudes and the phases of the d-axis voltage command Vd* and the q-axis voltage command Vq* such that the differences respectively fall within predetermined ranges, the differences between the amplitudes and the phases of the three-phase AC voltages Vu, Vv, and Vw outputted from the inverter 3 when the voltage phase error $\Delta\theta$v is constant, the amplitudes and the phases calculated based on the first d-axis voltage command Vd1* (not yet corrected) and the first q-axis voltage command Vq1* (not yet corrected), and the amplitudes and the phases of the three-phase AC voltages Vu, Vv, and Vw outputted from the inverter 3 when the voltage phase error $\Delta\theta$v is changed, the amplitudes and the phases calculated based on the second d-axis voltage command Vd2* (corrected) and the second q-axis voltage command Vq2*(corrected). With this configuration, even when the carrier wave frequency fc is adjusted to change the voltage phase error $\Delta\theta$v during the overmodulation where the modulation rate exceeds 1.15, it is possible to obtain the voltage amplitude and the voltage phase at desired values in the voltage outputted from the inverter 3. Thus, the torque in the motor 2 is stably outputted.

(3) The carrier wave frequency adjusting unit 16 adjusts the carrier wave frequency fc based on the torque command T* and the rotation speed $\omega$r of the motor 2, so as to change the voltage phase error $\Delta\theta$v. With this configuration, the vibration or the noise is less prone to occur in the motor 2.

(4) The carrier wave frequency adjusting unit 16 changes the voltage phase error $\Delta\theta$v based on the torque command T*, the rotation speed $\omega$r, and the modulation rate H representing the voltage amplitude ratio between the DC power supplied to the inverter 3 and the AC power outputted from the inverter 3. With this configuration, even when the dominant order of the electromagnetic excitation force or the torque pulsation (generated by the harmonic current) changes in accordance with the modulation rate H, and the vibration or the noise of the motor 2 thus changes in accordance with the modulation rate H, it is still possible to reliably compensate the change and thus possible to effectively suppress the vibration or the noise generated in the motor 2.

(5) In the carrier wave frequency adjusting unit 16, the synchronous PWM carrier wave number selection section 161 selects the synchronous PWM carrier wave number Nc at a predetermined integer, so that the carrier wave frequency adjusting unit 16 adjusts the carrier wave frequency fc to be an integer multiple of the frequency of each of the three-phase voltage commands Vu*, Vv*, and Vw*. With this configuration, the cycle and the phase of the triangular wave signal Tr (the carrier wave) are adjusted to have the desired relationship with the voltage waveforms of the three-phase voltage commands Vu*, Vv*, and Vw*, so that the synchronous PWM control is reliably performed.

(6) The current control unit 14 sets the predetermined value described above at 1.15, and corrects the amplitudes and the phases of the d-axis voltage command Vd* and the q-axis voltage command Vq* when the modulation rate H exceeds 1.15.

With this configuration, when the carrier wave frequency fc has been adjusted to change the voltage phase error Δθv, the amplitudes and the phases of the d-axis voltage command Vd* and the q-axis voltage command Vq* are reliably corrected during the overmodulation where the errors in the amplitude and the phase of the voltage outputted from the inverter 3 significantly increase.

(7) Based on the predetermined value of the modulation rate H, the current control unit 14 corrects the amplitudes and the phases of the d-axis voltage command Vd* and the q-axis voltage command Vq*, and the predetermined value may be set different between when the modulation rate H increases and when the modulation rate H decreases. With this configuration, when the modulation rate H repeatedly increases or decreases from the predetermined value, the chattering (caused by switching whether to or not to correct the amplitudes and the phases) is prevented. Thus, the voltage outputted from the inverter 3 is less prone to fluctuate.

(Second embodiment) Next, a second embodiment of the present invention will be described below with reference to the drawings. In this embodiment, an example, in which the system is configured to switch whether to or not to correct the amplitudes and the phases of the d-axis voltage command Vd* and the q-axis voltage command Vq* in accordance with the synchronous PWM carrier wave number Nc, will be described.

Figure 12:
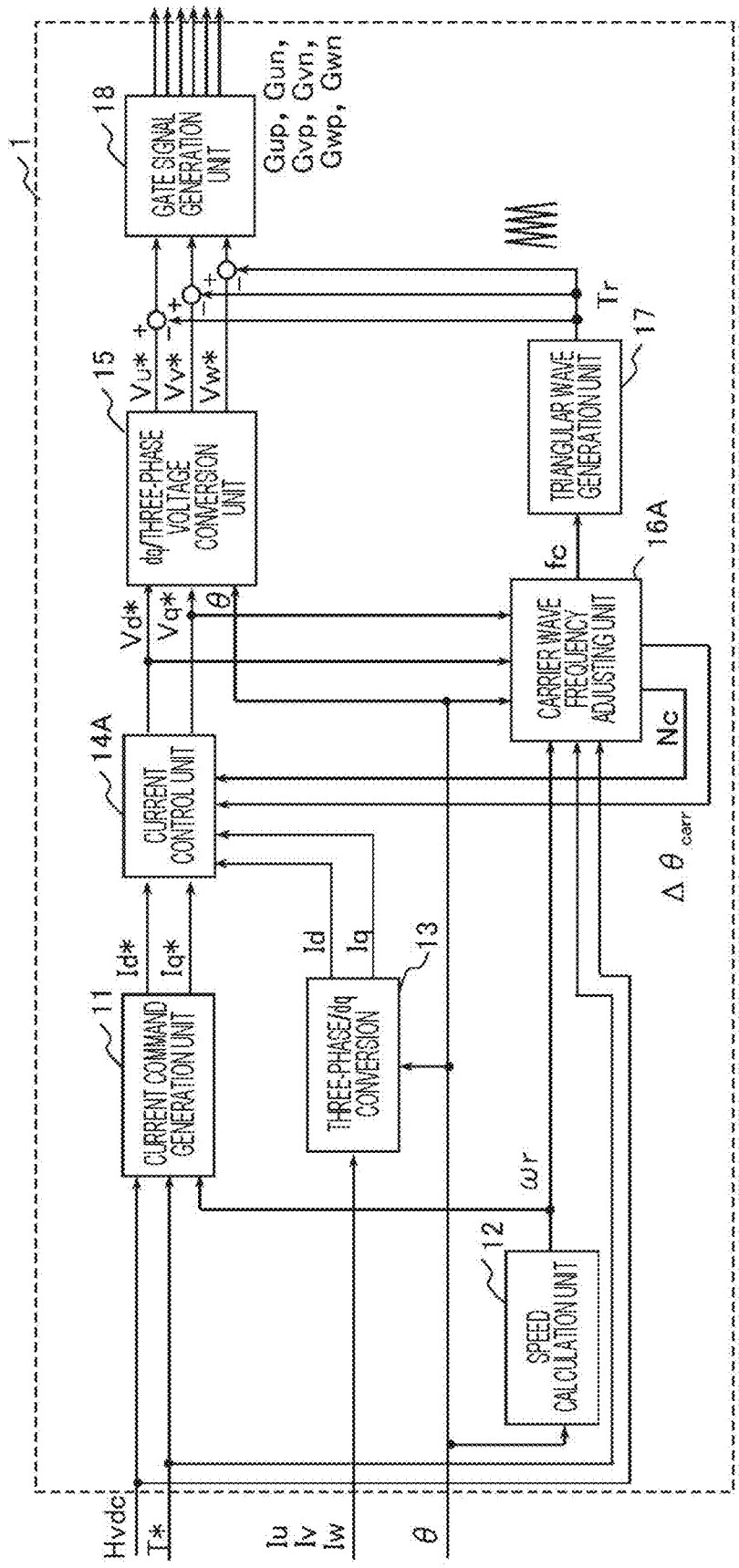
FIG. 12 is a block diagram illustrating a functional configuration of a motor control device according to a second embodiment of the present invention.

FIG. 12 is a block diagram illustrating a functional configuration of a motor control device 1 according to a second embodiment of the present invention. Compared with the configuration of FIG. 2 described in the first embodiment, the motor control device 1 of this embodiment has a configuration where the current control unit 14 is replaced with a current control unit 14A and the carrier wave frequency adjusting unit 16 is replaced with a carrier wave frequency adjusting unit 16A. The other configurations are the same as those of the first embodiment, and a detailed description thereof will thus be omitted below.

The carrier wave frequency adjusting unit 16A has a function to output the synchronous PWM carrier wave number Nc, in addition to the function that the carrier wave frequency adjusting unit 16 has in the first embodiment. The synchronous PWM carrier wave number Nc outputted from the carrier wave frequency adjusting unit 16A is to be inputted to the current control unit 14A.

Similarly to the current control unit 14 of the first embodiment, the current control unit 14A corrects the d-axis voltage command Vd* and the q-axis voltage command Vq* based on the value of the carrier wave phase difference Δθcarr during the overmodulation, so as to reduce the errors in the amplitude and the phase of the voltage outputted from the inverter 3 that vary in accordance with the value of the carrier wave phase difference Δθcarr. Here, the current control unit 14 further uses the synchronous PWM carrier wave number Nc inputted from the carrier wave frequency adjusting unit 16A, in order to switch whether to or not to correct the d-axis voltage command Vd* and the q-axis voltage command Vq*.

Figure 13:
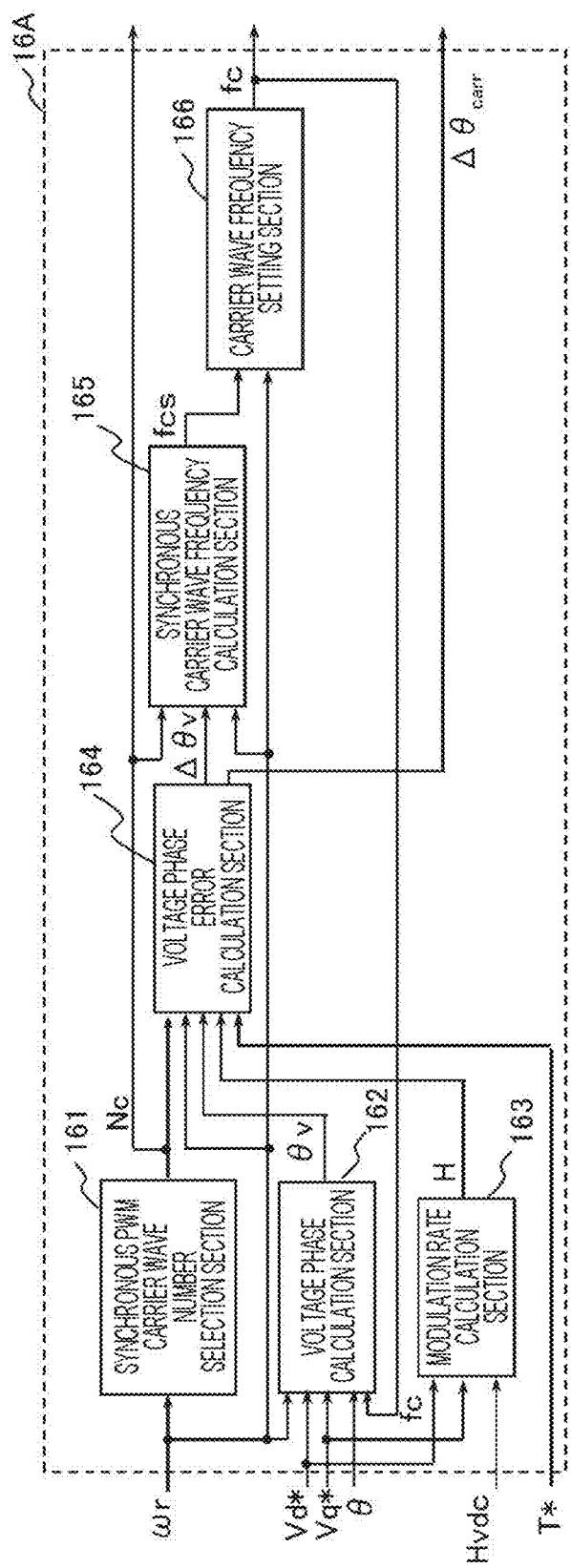
FIG. 13 is a block diagram of a carrier wave frequency adjusting unit according to the second embodiment of the present invention.

FIG. 13 is a block diagram of the carrier wave frequency adjusting unit 16A according to the second embodiment of the present invention. The carrier wave frequency adjusting unit 16A is similar in configuration to the carrier wave frequency adjusting unit 16 described in FIG. 3 of the first embodiment, except in that when the synchronous PWM carrier wave number selection section 161 has selected the synchronous PWM carrier wave number Nc, the carrier wave frequency adjusting unit 16A is configured to output the synchronous PWM carrier wave number Nc.

Figure 14:
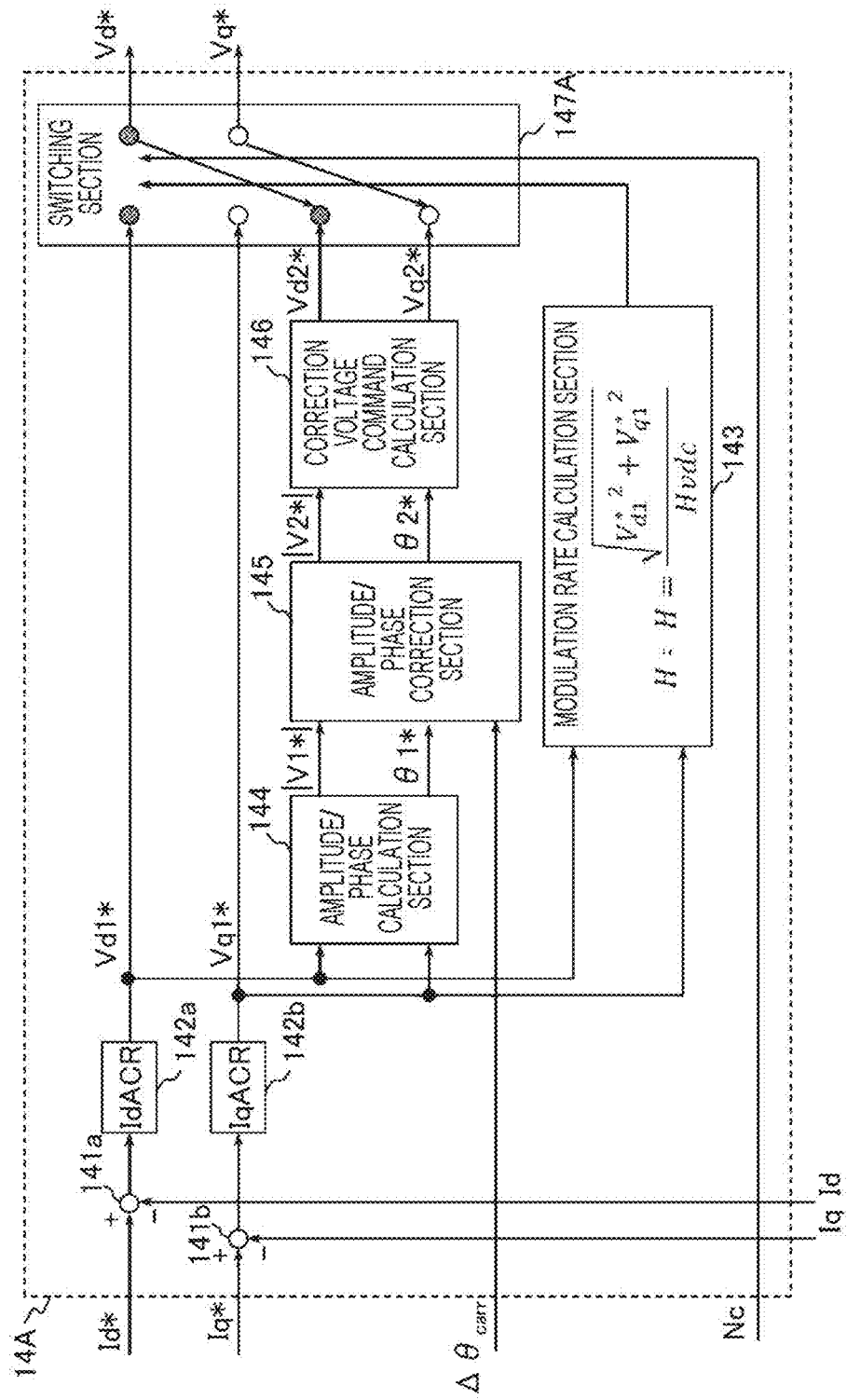
FIG. 14 is a block diagram of a current control unit according to the second embodiment of the present invention.

FIG. 14 is a block diagram of the current control unit 14A according to the second embodiment of the present invention. Compared with the current control unit 14 in FIG. 8 of the first embodiment, in the current control unit 14A, the switching section 147 is replaced with a switching section 147A. The other configurations are similar to those in the first embodiment.

Together with the modulation rate H that the modulation rate calculation section 143 has calculated, the synchronous PWM carrier wave number Nc that the carrier wave frequency adjusting unit 16A has outputted is inputted to the switching section 147A. Based on the values of the modulation rate H and the synchronous PWM carrier wave number Nc, the switching section 147A selects any one of the combinations as follows: the combination of the first d-axis voltage command Vd1* and the first q-axis voltage command Vq1* that the d-axis current control section 142a and the q-axis current control section 142b have respectively calculated, or the combination of the second d-axis voltage command Vd2* and the second q-axis voltage command Vq2* that the correction voltage command calculation section 146 has calculated. Then, the combination of the d-axis voltage command and the q-axis voltage command that the switching section 147 has selected is outputted as the d-axis voltage command Vd* and the q-axis voltage command Vq* that the current control unit 14 has calculated.

Specifically, for example, when at least either of conditions below is met, the combination of the first d-axis voltage command Vd1* and the first q-axis voltage command Vq1* is selected to be outputted: a condition that the value of the modulation rate H is equal to or smaller than 1.15, or a condition that the synchronous PWM carrier wave number Nc is equal to or greater than a predetermined value. On the other hand, when neither of the conditions is met, in other words, when the value of the modulation rate H is greater than 1.15 and the synchronous PWM carrier wave number Nc is smaller than the predetermined value, the combination of the first d-axis voltage command Vd1* and the first q-axis voltage command Vq1* is switched to the combination of the second d-axis voltage command Vd2* and the second q-axis voltage command Vq2*. With this configuration, considering the synchronous PWM carrier wave number Nc representing the number of the carrier waves per cycle of the modulation wave Vmod (three-phase voltage commands Vu*, Vv*, and Vw*), in addition to the modulation rate H, the current control unit 14A switches whether to or not to correct the amplitudes and the phases of the d-axis voltage command Vd* and the q-axis voltage command Vq* that are to be outputted. Here, as has been previously described, the synchronous PWM carrier wave number Nc is preferably a number as one of the multiples of 3.

With the current control unit 14A of this embodiment, similarly to the current control unit 14 of the first embodiment, the change rate of the voltage command before and after the switching process may be restricted to the constant value or less, or the hysteresis may be provided in the switching section 147A for when the modulation rate H increases and for when the modulation rate H decreases. Further, when the combination of the first d-axis voltage command Vd1* and the first q-axis voltage command Vq1* is switched to the combination of the second d-axis voltage command Vd2* and the second q-axis voltage command Vq2*, or vice versa, in accordance with the change in the synchronous PWM carrier wave number Nc, the amplitude and the phase of the voltage command before and after the switching process may be respectively and continuously changed. With this configuration, the switching process does not cause shock in the voltage outputted from the inverter 3, so that the motor control is smoothly performed.

As has been described above, in the second embodiment of the present invention, the current control unit 14A switches whether to or not to correct the amplitudes and the phases of the d-axis voltage command Vd* and the q-axis voltage command Vq* based on the synchronous PWM carrier wave number Nc as the number of the carrier waves per cycle of the voltage command. For example, when the synchronous PWM carrier wave number Nc is equal to or greater than the predetermined integer as the multiple of 3, the current control unit 14A preferably does not correct the amplitudes and the phases of the d-axis voltage command Vd* and the q-axis voltage command Vq*. With this configuration, the synchronous PWM carrier wave number Nc is sufficiently large, and thus, even when the carrier wave frequency fc is adjusted to change the voltage phase error Δθv, as long as the errors in the amplitude and the phase of the voltage outputted from the inverter 3 are sufficiently small, the current control unit 14A may do without correcting the amplitudes and the phases of the d-axis voltage command Vd* and the q-axis voltage command Vq*. Thus, it is possible to reduce load on the motor control device 1.

(Third embodiment) Next, a third embodiment of the present invention will be described below with reference to the drawings.

Figure 15:
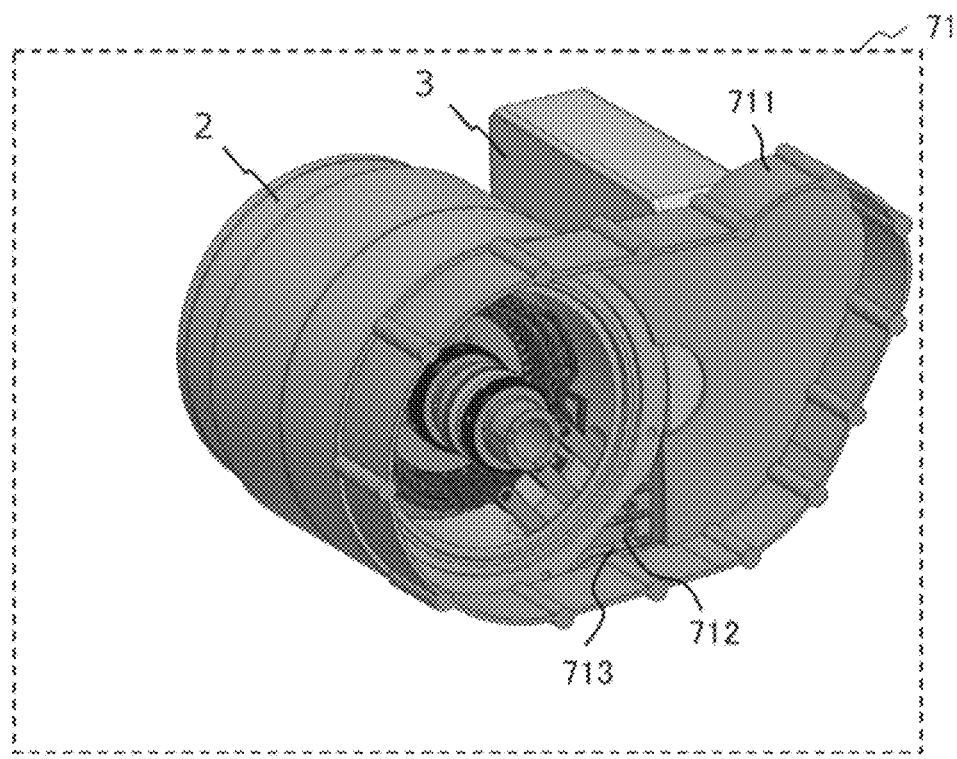
FIG. 15 is an external perspective view of an electromechanical unit to which the motor drive system of the present invention is applied.

FIG. 15 is an external perspective view of an electromechanical unit 71 according to the third embodiment of the present invention. The electromechanical unit 71 includes the motor drive system 100 (i.e., the motor control device 1, the motor 2, and the inverter 3) described in the first and second embodiments. The motor 2 and the inverter 3 are connected at a joint unit 713 via a bus bar 712. The output of the motor 2 is transmitted to a differential gear (not illustrated) via a gear 711 and is transmitted to an axle. While the motor control device 1 is not illustrated in FIG. 15, the motor control device 1 may be disposed at any position.

The electromechanical unit 71 has a feature where the motor 2, the inverter 3, and the gear 711 are integrally formed. Due to the integrated structure descried above, the electromechanical unit 71 is strongly required to be in smaller size, and concurrently, is required to provide high efficiency performance as in the conventional system. In view of this, the motor control device 1 described in the first and second embodiments is used, so that the modulation rate is improved and the DC voltage is effectively utilized while the voltage phase error Δθv is freely changed.

Accordingly, with the motor in smaller size, the electromechanical unit is reduced in size and highly efficient.

(Fourth embodiment) The motor drive system 100 has been described in the first and second embodiments, and next, an embodiment where the motor drive system 100 is applied to a vehicle will be described with reference to FIG. 16.

Figure 16:
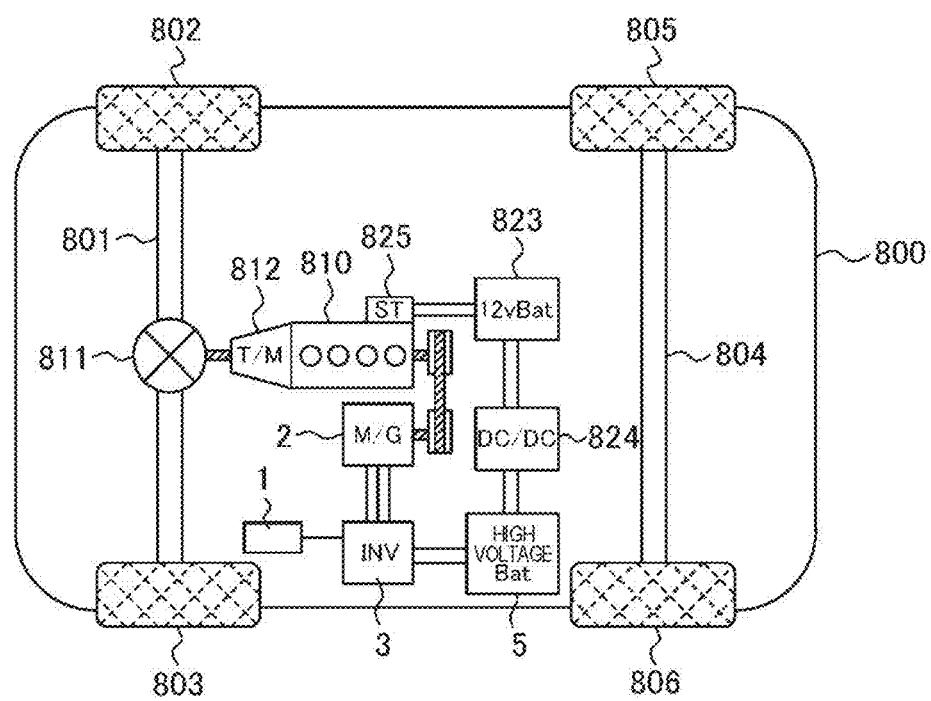
FIG. 16 is a configuration diagram of a hybrid automobile system to which the motor drive system of the present invention is applied.

FIG. 16 is a configuration diagram of a hybrid automobile system according to the fourth embodiment of the present invention. As illustrated in FIG. 16, the hybrid automobile system of this embodiment has a power train where the motor 2 is applied as a motor/generator.

In the hybrid automobile system illustrated in FIG. 16, a vehicle body 800 includes, at its front portion, a front wheel axle 801, a front wheel 802, and a front wheel 803. The front wheel axle 801 is axially and rotatably supported, and the front wheels 802 and 803 are disposed at both ends of the front wheel axle 801. The vehicle body 800 includes, at its rear portion, a rear wheel axle 804, a rear wheel 805, and a rear wheel 806. The rear wheel axle 804 is axially and rotatably supported, and the rear wheels 805 and 806 are disposed at both ends of the rear wheel axle 804.

The vehicle body 800 further includes a differential gear 811, an engine 810, and a transmission 812. At a central portion of the front wheel axle 801, the differential gear 811 as a power distribution mechanism is disposed, and rotation drive force transmitted from the engine 810 through the transmission 812 is to be distributed to the front wheel axle 801 extending left and right from the differential gear 811.

The engine 810 includes a crankshaft having a pulley thereon, and the pulley is mechanically connected via a belt to a pulley disposed on a rotation shaft of the motor 2.

With this configuration, the rotation drive force of the motor 2 is transmitted to the engine 810, and the rotation drive force of the engine 810 is transmitted to the motor 2. In the motor 2, the three-phase AC power outputted from the inverter 3 under the control of the motor control device 1 is supplied to a stator coil of the stator, thereby causing the rotor to rotate to generate the rotation drive force in accordance with the three-phase AC power.

In other words, while the motor 2 operates as an electric motor under the control of the motor control device 1, the rotation drive force of the engine 810 causes the rotor to rotate, thereby inducing electromotive force in the stator coil of the stator. As a result, the motor 2 operates as the generator to generate the three-phase AC power.

The inverter 3 corresponds to a power conversion device configured to convert the DC power to the three-phase AC power, the DC power supplied from the high voltage battery 5 as a high voltage (42V or 300V) system power supply, and controls the three-phase AC current flowing through the stator coil of the motor 2 based on an operation command value and a magnetic pole position of the rotor.

The three-phase AC power generated by the motor 2 is to be converted to the DC power by the inverter 3 to charge the high voltage battery 5. The high voltage battery 5 is electrically connected to a low voltage battery 823 via a DC-DC converter 824. The low voltage battery 823 is included in a low voltage (14V) system power supply of an automobile, and is used as a power supply for a starter 825 to initially start (cold start) the engine 810, a radio, lights, or others.

When the vehicle is at a stop (idle stop mode), e.g., a traffic stop light, the engine 810 stops, and when the engine 810 restarts (engine hot start) at restart of the vehicle, the inverter 3 drives the motor 2 to restart the engine 810. Here, in the idle stop mode, when a charging amount of the high voltage battery 5 is insufficient or when the engine 810 is not sufficiently warmed up, the engine 810 does not stop but continues to be driven. Further, during the idle stop mode, it is necessary to secure a drive source for auxiliary machines that use the engine 810 as a drive source, such as an air conditioner compressor. In this case, the motor 2 is driven to drive the auxiliary machines.

In an acceleration mode or a high load operation mode too, the motor 2 is driven to assist the drive of the engine 810. On the other hand, in a charge mode where the high voltage battery 5 needs to be charged, the engine 810 causes the motor 2 to generate the power to charge the high voltage battery 5. In other words, the mode corresponds to a regeneration mode, e.g., braking or deceleration of the vehicle.

In the hybrid automobile system of FIG. 16 including the motor drive system 100 of the first and second embodiments, even when a magnet temperature of the motor 2 exceeds a predetermined value, an effective value of line voltage, the DC voltage (in a case of a boosting system), or the rpm of the motor 2 (in a case of an engine generator) is changed, so that an absolute value of the voltage is not limited within a predetermined range and harmonic voltage having twice as much frequency as a switching frequency is not generated. As a result, an eddy current loss of the rotor magnet is reduced, thereby resulting in an improvement of a continuous rating of a motor used in an environmentally friendly vehicle such as an electric automobile or a hybrid automobile. In other words, it is possible to improve torque required for continuous traveling such as traveling on a slope at high speed.

Note that, the present invention is not limited to those described in the foregoing embodiments, and may be modified in various manners within a range not deviating from the spirit of the present invention.

REFERENCE SIGNS LIST

1 motor control device
2 permanent magnet synchronous motor (motor)
3 inverter
4 rotation position sensor
5 high voltage battery
7 current detection means
11 current command generation unit
12 speed calculation unit
13 three-phase/dq conversion current control unit
14, 14A current control unit
15 dq/three-phase voltage command conversion unit
16, 16A carrier wave frequency adjusting unit
17 triangular wave generation unit
18 gate signal generation unit
31 inverter circuit
32 PWM signal drive circuit
33 smoothing capacitor
41 rotation position detector
71 electromechanical unit
100 motor drive system
141a, 141b subtraction section
142a d-axis current control section (IdACR)
142b q-axis current control section (IqACR)
143 modulation rate calculation section
144 amplitude/phase calculation section
145 amplitude/phase correction section
146 correction voltage command calculation section
147 switching section
161 synchronous PWM carrier wave number selection section
162 voltage phase calculation section
163 modulation rate calculation section
164 voltage phase error calculation section
165 synchronous carrier wave frequency calculation section
166 carrier wave frequency setting section
711 gear
712 bus bar
713 joint unit
800 vehicle body
801 front wheel axle
802 front wheel
803 front wheel
804 rear wheel axle
805 rear wheel
806 rear wheel
810 engine
810a pulley
811 differential gear
812 transmission
823 low voltage battery
824 DC-DC converter
825 starter
1641 reference voltage phase calculation part
1644 carrier triangular wave phase table
1645 voltage phase difference conversion part
1646 addition part
1647 subtraction section

The invention claimed is:

1. A motor control device connected to a power converter that performs power conversion from direct current power to alternating current power, and configured to control drive of an alternating current motor driven with the alternating current power,
the motor control device comprising:
a current control unit configured to generate a voltage command in accordance with a torque command;
a carrier wave generation unit configured to generate a carrier wave;
a carrier wave frequency adjusting unit configured to adjust a frequency of the carrier wave; and
a gate signal generation unit configured to perform pulse width modulation of the voltage command based on the carrier wave, so as to generate a gate signal to control an operation of the power converter, wherein
the carrier wave frequency adjusting unit adjusts the frequency of the carrier wave, so as to change a phase difference between a phase of the voltage command and a phase of the carrier wave, and
the current control unit corrects an amplitude of the voltage command and the phase of the voltage command based on the phase of the carrier wave, when a modulation rate in accordance with a voltage amplitude ratio between the direct current power and the alternating current power exceeds a predetermined value.

2. The motor control device according to claim 1, wherein the current control unit corrects the amplitude and the phase of the voltage command, so as to cause a difference to fall within a predetermined range, the differences respectively between an amplitude and a phase of an alternating current voltage outputted from the power converter when the phase difference is constant, the amplitude and the phase based on the voltage command that has not been yet corrected, and an amplitude and a phase of the alternating current voltage outputted from the power converter when the phase difference is changed, the amplitude and the phase based on the voltage command that has been corrected.

3. The motor control device according to claim 1, wherein the carrier wave frequency adjusting unit adjusts the frequency of the carrier wave based on the torque command and rotation speed of the alternating current motor, so as to change the phase difference.

4. The motor control device according to claim 3, wherein the carrier wave frequency adjusting unit changes the phase difference based on the torque command, the rotation speed, and the voltage amplitude ratio.

5. The motor control device according to claim 1, wherein the carrier wave frequency adjusting unit adjusts the frequency of the carrier wave, so as to cause the frequency of the carrier wave to be an integer multiple of a frequency of the voltage command.

6. The motor control device according to claim 5, wherein the current control unit switches, based on a number of the carrier waves per cycle of the voltage command, whether to or not to correct the amplitude and the phase of the voltage command.

7. The motor control device according to claim 6, wherein when the number of the carrier waves per cycle of the voltage command is equal to or greater than a predetermined integer as a multiple of 3, the current control unit does not correct the amplitude or the phase of the voltage command.

8. The motor control device according to claim 6, wherein when the number of the carrier waves per cycle of the voltage command changes, the current control unit continuously changes the amplitude and the phase of the voltage command.

9. The motor control device according to claim 1, wherein the predetermined value corresponds to 1.15.

10. The motor control device according to claim 1, wherein
 the predetermine value is set to be different between when the modulation rate increases and when the modulation rate decreases.

11. An electromechanical unit comprising:
 the motor control device according to claim 1;
 a power converter connected to the motor control device;
 an alternating current motor driven by the power converter; and
 a gear configured to transmit rotation drive force of the alternating current motor, wherein
 the alternating current motor, the power converter, and the gear are integrally formed.

12. An electric vehicle system comprising:
 the motor control device according to claim 1;
 a power converter connected to the motor control device; and
 an alternating current motor driven by the power converter,
 the electric vehicle system configured to travel with rotation drive force of the alternating current motor.

13. A motor control method configured to control an operation of a power converter that performs power conversion from direct current power to alternating current power, so as to control drive of an alternating current motor driven with the alternating current power,
 the motor control method comprising:
 generating a voltage command in accordance with a torque command;
 generating a carrier wave;
 adjusting a frequency of the carrier wave to change a phase difference between a phase of the voltage command and a phase of the carrier wave;
 performing pulse width modulation of the voltage command based on the carrier wave, so as to generate a gate signal to control the operation of the power converter; and
 when, in generating the voltage command, a modulation rate in accordance with a voltage amplitude ratio between the direct current power and the alternating current power exceeds a predetermined value, correcting an amplitude of the voltage command and the phase of the voltage command based on the phase of the carrier wave.

\* \* \* \* \*